United States Patent
Imamura

(10) Patent No.: US 11,287,034 B2
(45) Date of Patent: Mar. 29, 2022

(54) LOCKUP CONTROL DEVICE AND LOCKUP CONTROL METHOD FOR VEHICLE POWER TRANSMISSION DEVICE

(71) Applicant: TOYOTA JIDOSHA KABUSHIKI KAISHA, Toyota (JP)

(72) Inventor: Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/102,641

(22) Filed: Nov. 24, 2020

(65) Prior Publication Data
US 2021/0262567 A1    Aug. 26, 2021

(30) Foreign Application Priority Data
Feb. 25, 2020    (JP) .............................. JP2020-029904

(51) Int. Cl.
*F16H 61/14*    (2006.01)
*F16H 59/72*    (2006.01)
*F16H 59/46*    (2006.01)
*F16H 61/02*    (2006.01)

(52) U.S. Cl.
CPC .......... *F16H 61/143* (2013.01); *F16H 59/46* (2013.01); *F16H 59/72* (2013.01); *F16H 61/0204* (2013.01); *F16H 2061/145* (2013.01)

(58) Field of Classification Search
CPC ......... F16H 2061/145; F16H 2059/462; F16H 2059/465; F16H 2059/467
See application file for complete search history.

(56) References Cited

U.S. PATENT DOCUMENTS 6,341,679 B1    1/2002    Abe et al.
2010/0312444 A1    12/2010    Takamatsu et al.

FOREIGN PATENT DOCUMENTS

| CN | 107218389 A | * | 9/2017 | ............. F16H 61/14 |
| JP | 2011247285 A | * | 12/2011 | ............. F16H 61/14 |
| JP | 4896184 B2 | | 3/2012 | |
| JP | 5549291 B2 | | 7/2014 | |
| JP | 2017-211027 A | | 11/2017 | |

OTHER PUBLICATIONS

Machine translation of JP 2017211027 filed Aug. 12, 2021 (Year: 2021).*

* cited by examiner

*Primary Examiner* — Tisha D Lewis
(74) *Attorney, Agent, or Firm* — Oliff PLC

(57) ABSTRACT

Provided is a lockup control device and a lockup control method for a vehicle power transmission device provided with a fluid transmission device including a lockup clutch. The lockup clutch is controlled to perform slip-engagement such that a differential rotation between an input-side rotating member and an output-side rotating member of the fluid transmission device is a target differential rotation set in advance, and the target differential rotation is corrected based on transition of a heat accumulation amount applied to friction members of the lockup clutch.

8 Claims, 13 Drawing Sheets

| | ENGAGEMENT SCHEDULE | | | | | |
|---|---|---|---|---|---|---|
| | C1 | C2 | C3 | C4 | B1 | B2 |
| 1st | ○ | | | | | ○ |
| 2nd | ○ | | | | ○ | |
| 3rd | ○ | | ○ | | | |
| 4th | ○ | | | ○ | | |
| 5th | ○ | ○ | | | | |
| 6th | | ○ | | ○ | | |
| 7th | | ○ | ○ | | | |
| 8th | | ○ | | | ○ | |
| Rev | | | ○ | | | ○ |

LOCKUP CONTROL DEVICE AND LOCKUP CONTROL METHOD FOR VEHICLE POWER TRANSMISSION DEVICE

CROSS-REFERENCE TO RELATED APPLICATIONS

This application claims priority to Japanese Patent Application No. 2020-029904 filed on Feb. 25, 2020, which is incorporated herein by reference in its entirety.

BACKGROUND

1. Technical Field

The disclosure relates to a vehicle power transmission device, and in particular relates to a lockup control device and a lockup control method for a vehicle power transmission device that is provided with a fluid transmission device including a lockup clutch.

2. Description of Related Art

With regard to a vehicle power transmission device provided with a fluid transmission device including a lockup clutch, there is known a lockup control device for a vehicle power transmission device that executes flex lockup control for slip-engagement of the lockup clutch such that the differential rotation of an input-side rotating member and an output-side rotating member of the fluid transmission device is a target differential rotation set in advance. A device described in Japanese Unexamined Patent Application Publication No. 2017-211027 (JP 2017-211027 A) is an example of the lockup control device, and this literature proposes a technology that performs flex lockup control taking into consideration the amount of heat generated by friction members of the lockup clutch during slip-engagement thereof under flex lockup control, since the heat generated may compromise durability.

SUMMARY

However, there is a possibility that flex lockup control based on the amount of heat generated will restrict flex lockup control beyond necessity, or conversely not sufficiently protect friction members and result in compromised durability.

The disclosure proposes a lockup control device and a lockup control method for a vehicle power transmission device, in which friction members are appropriately protected from deterioration due to heat and durability is improved, without restricting flex lockup control beyond necessity.

A first aspect of the disclosure relates to a lockup control device for a vehicle power transmission device provided with a fluid transmission device including a lockup clutch. The lockup control device is provided with an electronic control unit configured as follows. The electronic control unit is configured to execute flex lockup control to cause slip-engagement of the lockup clutch such that a differential rotation between an input-side rotating member and an output-side rotating member of the fluid transmission device is a target differential rotation set in advance, and to correct the target differential rotation based on transition of a heat accumulation amount applied to friction members of the lockup clutch.

With the lockup control device for the vehicle power transmission device according to the first aspect, the target differential rotation is corrected based on the transition of the heat accumulation amount applied to the friction members of the lockup clutch, and accordingly the friction members can be appropriately protected. That is to say, the heat accumulation amount is obtained by subtracting a heat dissipation amount from a heat generation amount, and is a parameter that more appropriately reflects the effects of heat on the friction members, and accordingly the friction members can be appropriately protected from deterioration due to heat and durability can be improved, without restricting flex lockup control beyond necessity.

In the lockup control device for the vehicle power transmission device according to the above aspect, the electronic control unit may be configured to calculate the heat accumulation amount, to calculate a long-term change that is a change in a cumulative heat accumulation amount obtained by cumulating the heat accumulation amount, as the transition of the heat accumulation amount, and to correct the heat accumulation amount to make the target differential rotation smaller when the long-term change is large, as compared to when the long-term change is small.

With the lockup control device of the above configuration, correction of the heat accumulation amount is performed based on the long-term change of the heat accumulation amount that is a change in a cumulative heat accumulation amount obtained by cumulating the heat accumulation amount, to make the target differential rotation smaller when the long-term change is large, as compared to when the long-term change is small. That is to say, even though the effects of heat by performing flex lockup control once may be small, the friction members deteriorate due to fatigue by repeated execution of flex lockup control. However, correcting the target differential rotation based on the long-term change of the heat accumulation amount enables deterioration of the friction members due to excessive fatigue to be suppressed, and durability to be improved.

In the lockup control device for the vehicle power transmission device according to the above configuration, the long-term change may be a change in the cumulative heat accumulation amount with respect to a driving distance of a vehicle, and the electronic control unit may be configured to correct the heat accumulation amount to make the target differential rotation smaller when the cumulative heat accumulation amount is large and the driving distance is short, as compared to when the cumulative heat accumulation amount is small and the driving distance is long.

With the lockup control device of the above configuration, the magnitude in the long-term change of the heat accumulation amount is specifically defined, and the heat accumulation amount is corrected to make the target differential rotation smaller when the cumulative heat accumulation amount is large and the driving distance is short, i.e., when the long-term change of the heat accumulation amount is large, as compared to when the cumulative heat accumulation amount is small and the driving distance is long, i.e., when the long-term change of the heat accumulation amount is small, which enables deterioration of the friction members due to excessive fatigue to be appropriately suppressed, and durability to be improved.

In the lockup control device for the vehicle power transmission device according to the above configuration, the electronic control unit may be configured to correct the heat accumulation amount following a correction rule set in advance for each of a plurality of regions set in advance with the driving distance and the cumulative heat accumulation amount as parameters, to make the target differential rotation smaller in a region where the cumulative heat accumulation amount is large and the driving distance is short, as compared to a region where the cumulative heat accumulation amount is small and the driving distance is long.

With the lockup control device of the above configuration, the heat accumulation amount is corrected following the correction rule set in advance for each of a plurality of regions set in advance with the driving distance of the vehicle and the cumulative heat accumulation amount as parameters, to make the target differential rotation smaller in the region where the cumulative heat accumulation amount is large and the driving distance is short, as compared to the region where the cumulative heat accumulation amount is small and the driving distance is long. Accordingly, the target differential rotation can be appropriately corrected in accordance with the transition (magnitude of change) of different cumulative heat accumulation amounts for each of the regions, and durability of the friction members can be improved.

In the lockup control device for the vehicle power transmission device according to the above aspect, the electronic control unit may be configured to calculate the heat accumulation amount, to calculate a change rate of the heat accumulation amount per unit time at a current point in time, as the transition of the heat accumulation amount, and to correct the heat accumulation amount to make the target differential rotation smaller when the change rate is large, as compared to when the change rate is small.

With the lockup control device of the above configuration, the heat accumulation amount is corrected based on the change rate of the heat accumulation amount per unit time at the current point in time, to make the target differential rotation smaller when the change rate is large, as compared to when the change rate is small. Accordingly, the target differential rotation is appropriately corrected based on the change rate of the heat accumulation amount, which enables deterioration of the friction members due to heat to be suppressed, and durability to be improved.

In the lockup control device for the vehicle power transmission device according to the above aspect, the electronic control unit may be configured to, in addition to correcting the target differential rotation based on the transition of the heat accumulation amount, correct the target differential rotation in accordance with a degree of oxidative deterioration of lubricating oil that lubricates the friction members following a lubricating oil deterioration correction rule set in advance, to make the target differential rotation smaller when the degree of oxidative deterioration is large, as compared to when the degree of oxidative deterioration is small.

With the lockup control device of the above configuration, when correcting the target differential rotation in accordance with the degree of oxidative deterioration of the lubricating oil following the lubricating oil deterioration correction rule, separately from correction of the heat accumulation amount, increase of thermal load on the friction members from lower lubrication performance due to deterioration of lubricating oil can be suppressed, and durability can be improved.

In the lockup control device for the vehicle power transmission device according to the above aspect, the electronic control unit may be configured to, in addition to correcting the target differential rotation based on the transition of the heat accumulation amount, correct the target differential rotation in accordance with an amount of inclusion of foreign matter in lubricating oil that lubricates the friction members following a foreign matter inclusion correction rule set in advance, to make the target differential rotation smaller when the amount of inclusion of foreign matter is large, as compared to when the amount of inclusion of foreign matter is small.

With the lockup control device of the above configuration, when correcting the target differential rotation in accordance with the amount of inclusion of foreign matter in the lubricating oil following the foreign matter inclusion correction rule, separately from correction of the heat accumulation amount, increase of thermal load on the friction members from lower lubrication performance due to inclusion of foreign matter can be suppressed, and durability can be improved.

In the lockup control device for the vehicle power transmission device according to the above aspect, the electronic control unit may be configured to, in addition to correcting the target differential rotation based on the transition of the heat accumulation amount, correct the target differential rotation for each of a plurality of localities where a vehicle in which the vehicle power transmission device is installed is used, following a locality-based correction rule set in advance, to make a correction amount of the target differential rotation larger in a locality where the correction amount of the target differential rotation due to correction of the heat accumulation amount is large as compared to a locality where the correction amount is small.

With the lockup control device of the above configuration, when correcting the target differential rotation following the locality-based correction rule for each of the localities where the correction amount of the target differential rotation due to correction of the heat accumulation amount differs among the localities, separately from correction of the heat accumulation amount, the target differential rotation is appropriately corrected in accordance with the difference in the correction amount of the target differential rotation due to correction of the heat accumulation amount for each of the localities. That is to say, the target differential rotation is appropriately corrected in accordance with difference in transition of the heat accumulation amount occurring due to differences in vehicle driving conditions of each of the localities and so forth, whereby deterioration of the friction members due to heat can be suppressed and durability can be improved.

A second aspect of the disclosure relates to a lockup control method for a vehicle power transmission device provided with a fluid transmission device including a lockup clutch. The lockup control method includes controlling the lockup clutch to perform slip-engagement such that a differential rotation between an input-side rotating member and an output-side rotating member of the fluid transmission device is a target differential rotation set in advance; and correcting the target differential rotation based on the transition of a heat accumulation amount applied to friction members of the lockup clutch.

With the lockup control method for the vehicle power transmission device according to the second aspect, the target differential rotation is corrected based on the transition of the heat accumulation amount applied to the friction members of the lockup clutch, and accordingly the friction members can be appropriately protected. That is to say, the friction members can be appropriately protected from deterioration due to heat and durability can be improved, without restricting flex lockup control beyond necessity.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
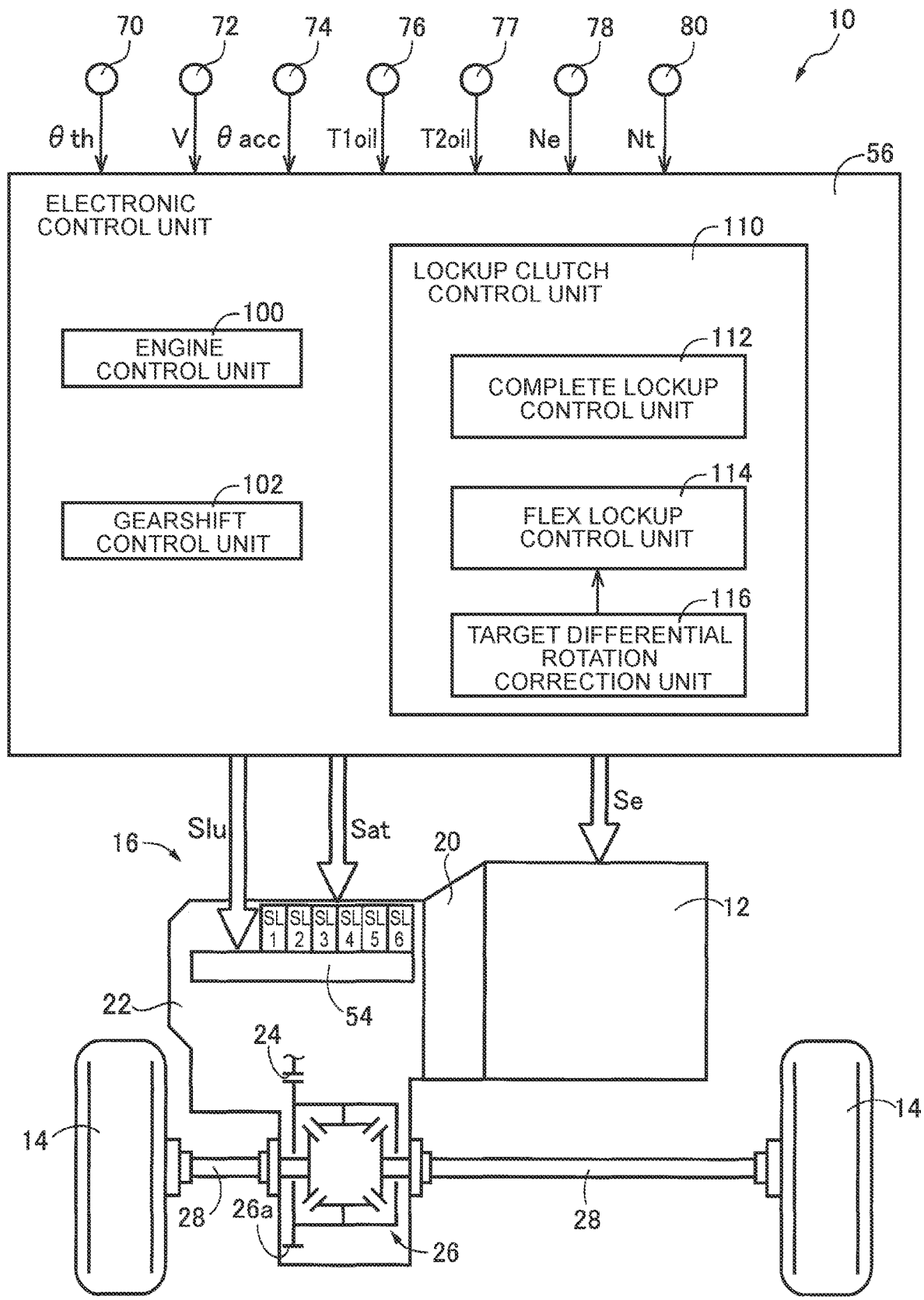
FIG. 1 is a diagram illustrating a schematic configuration of a drive system of a vehicle provided with a lockup control device for a vehicle power transmission device according to a first embodiment of the disclosure, and illustrating main components of control functions for various types of control in the vehicle.

The disclosure is applicable to various types of vehicle power transmission devices provided with a fluid transmission device including a lockup clutch. An internal combustion engine, for example, is used as the prime mover that is the power source of the vehicle, but an arrangement may be used where an electric motor and an engine are used in conjunction. A stepped or variable speed automatic transmission is provided as necessary for the vehicle power transmission device. A fluid transmission device performs power transmission through fluid, examples of which include torque converters, fluid coupling, and so forth. A lockup clutch enables direct linking between an input-side rotating member and an output-side rotating member of the fluid transmission device by frictional force. A single-plate or multi-plate hydraulic friction clutch that is capable of slipping engagement is suitably used, but clutches of other types of friction engagement may be employed, such as an electromagnetic friction clutch or the like.

Heat accumulation amount-based correction, for correcting the target differential rotation based on transition of the heat accumulation amount, uses a change in the cumulative heat accumulation amount obtained by cumulating the heat accumulation amount (long-term change of heat accumulation amount), for example, as transition of heat accumulation amount. Correction is arranged to be performed based on the magnitudes of the long-term change, such that when the long-term change is large, the target differential rotation is smaller in comparison with when the long-term change is small. The amount of correction of the target differential rotation may be determined in accordance with the magnitude in the long-term change here, or correction may be made based on the change rate of heat accumulation amount at the current point in time, for example, such that when the change rate is large, the target differential rotation is smaller in comparison with when the change rate is small. The change rate of heat accumulation amount is also one example of transition of heat accumulation amount, and the heat accumulation amount-based correction may be performed based on the change rate alone, regardless of the long-term change, such that when the change rate is large, the target differential rotation is smaller in comparison with when the change rate is small, for example. Correction of the target differential rotation may be to further correct the target differential rotation at the current point in time after correction having been performed, or correction may be performed with an initial value of the target differential rotation set in advance as a reference. When performing correction with the initial value as a reference, downward correction, where the target differential rotation is set to be smaller than the initial value in accordance with transition in the heat accumulation amount, is normally performed. Also, when the target differential rotation is variably set in accordance with driving distance and so forth, taking the cumulative heat accumulation amount into consideration, the target differential rotation is corrected upwards/downwards in accordance with the actual transition in the heat accumulation amount.

For the change rate in heat accumulation amount at the current point in time, the amount of change in the heat accumulation amount per unit time, for example, is suitable, but various arrangement may be made, such as the amount of change in the heat accumulation amount per unit driving distance, the amount of change in the heat accumulation amount per unit rotations of a predetermined member, and so forth. For the long-term change in the heat accumulation amount, a change in the cumulative heat accumulation amount (amount of change, change rate, and so forth) as to the driving distance of the vehicle, for example, is suitable. For the cumulative heat accumulation amount, cumulation of the heat accumulation amount for all time that the vehicle is driven, for example, is suitable, but cumulation just of the heat accumulation amount for the time that flex lockup control is being performed is sufficient. When finding the cumulative heat accumulation amount by cumulating the heat accumulation amount for all time that the vehicle is driven, correcting the target differential rotation based on the change in the cumulative heat accumulation amount as to the total driving distance of the vehicle is suitable. Also, various parameters that have a certain level of correlation with the cumulative heat accumulation amount may be used besides driving distance, such as, for example, the change in the cumulative heat accumulation amount as to total rotations where rotations of the input-side rotating member or the output-side rotating member of the lockup clutch are added, the change in the cumulative heat accumulation amount as to total differential rotation where differential rotation of the input-side rotating member and the output-side rotating member thereof are added, the change in the cumulative heat accumulation amount as to cumulative driving time, and so forth.

The above-described correction of the target differential rotation based on the long-term change of the heat accumulation amount (heat accumulation amount-based correction) is performed following correction rules set in advance for each of a plurality of regions set, with driving distance and the cumulative heat accumulation amount, for example, as parameters. However, an arrangement may be made where no such regions are set, and continuous or stepwise target differential rotation correction is performed in accordance with the magnitude of the change in the cumulative heat accumulation amount, following correction rules set in advance so that when the change in the cumulative heat accumulation amount is large (e.g., when the cumulative heat accumulation amount is large and the driving distance is short), the target differential rotation is made to be smaller in comparison with when the change in the cumulative heat accumulation amount is small (e.g., when the cumulative heat accumulation amount is small and the driving distance is long). Correction of the target differential rotation based on the change rate of the heat accumulation amount at the current point in time (heat accumulation amount-based correction) is also arranged to be performed such that continuous or stepwise target differential rotation correction is performed in accordance with the magnitude of the change rate, following correction rules set in advance so that when the change rate is large, the target differential rotation is made to be smaller in comparison with when the change rate is small, for example.

A target differential rotation correction unit is configured to correct the target differential rotation in accordance with the degree of oxidative deterioration and the amount of inclusion of foreign matter in lubricating oil, or the difference in correction amount depending on the locality, for example, aside from the heat accumulation amount-based correction. However, it is sufficient for the disclosure for at least the heat accumulation amount-based correction to be performed, and correction of the target differential rotation based on the degree of oxidative deterioration and the amount of inclusion of foreign matter in lubricating oil, or the difference in correction amount depending on the locality, does not necessarily have to be performed. Also, still other correction elements that are different from the degree of oxidative deterioration and the amount of inclusion of foreign matter of lubricating oil and the difference in correction amount depending on the locality may be used to correct the target differential rotation.

Embodiments of the disclosure will be described in detail below, with reference to the drawings. Note that the drawings in the following embodiments have been simplified or modified as appropriate, and that the dimensional ratios, shapes, and so forth of the parts are not necessarily accurately drawn.

FIG. 1 is a diagram illustrating a schematic configuration of a drive system of a vehicle 10 provided with a lockup control device according to a first embodiment of the disclosure, and illustrating main components of control functions for various types of control in the vehicle 10. The vehicle 10 is provided with an engine 12, drive wheels 14, and a vehicle power transmission device 16 (hereinafter referred to as "power transmission device 16") provided on a power transmission path between the engine 12 and the drive wheels 14. The power transmission device 16 is provided with a torque converter 20 and an automatic transmission 22 accommodated within a casing 18 (see FIG. 2) serving as a non-rotating member, a differential gear unit (differential gearset) 26 of which a ring gear 26a meshes with a transmission output gear 24 that is an output-side rotating member of the automatic transmission 22, a pair of drive shafts 28 linked to the differential gear unit 26, and so forth. The casing 18 is attached to the vehicle body. In the power transmission device 16, power output from the engine 12 is transmitted to the drive wheels 14 through the torque converter 20, the automatic transmission 22, the differential gear unit 26, the drive shafts 28, and so forth in succession. The engine 12 is the power source of the vehicle 10, i.e., the prime mover, and is an internal combustion engine such as a gasoline engine or a diesel engine or the like for example, and the torque converter 20 is a fluid transmission device.

Figure 2:
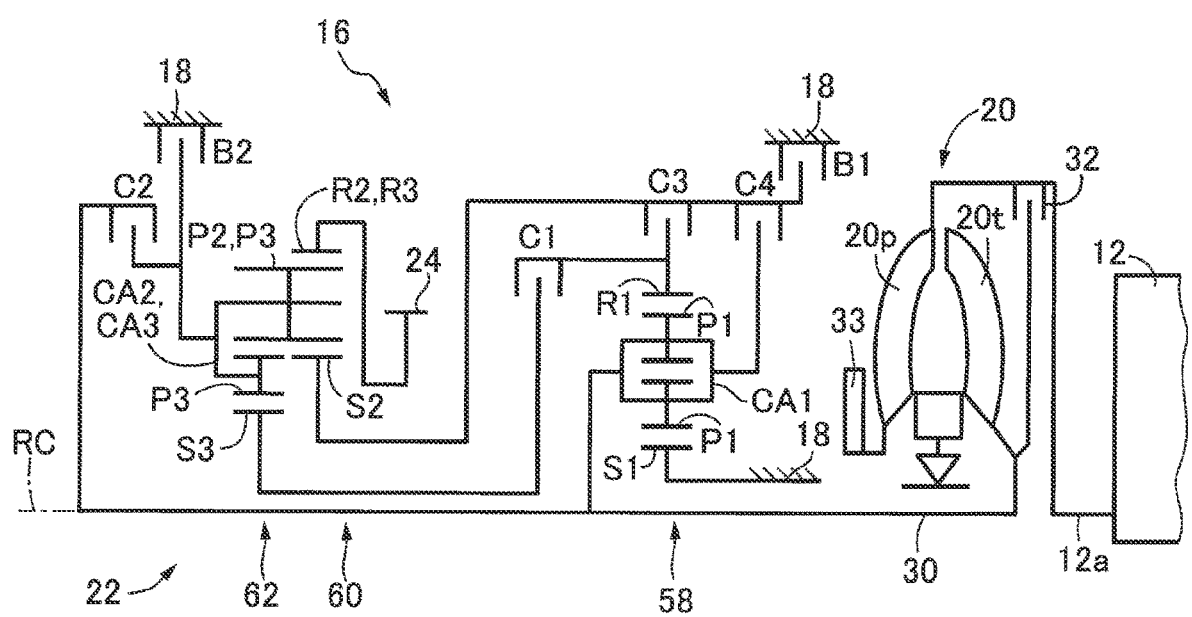
FIG. 2 is a basic diagram illustrating an example of a torque converter and an automatic transmission provided to the vehicle in FIG. 1.
Figure 3:
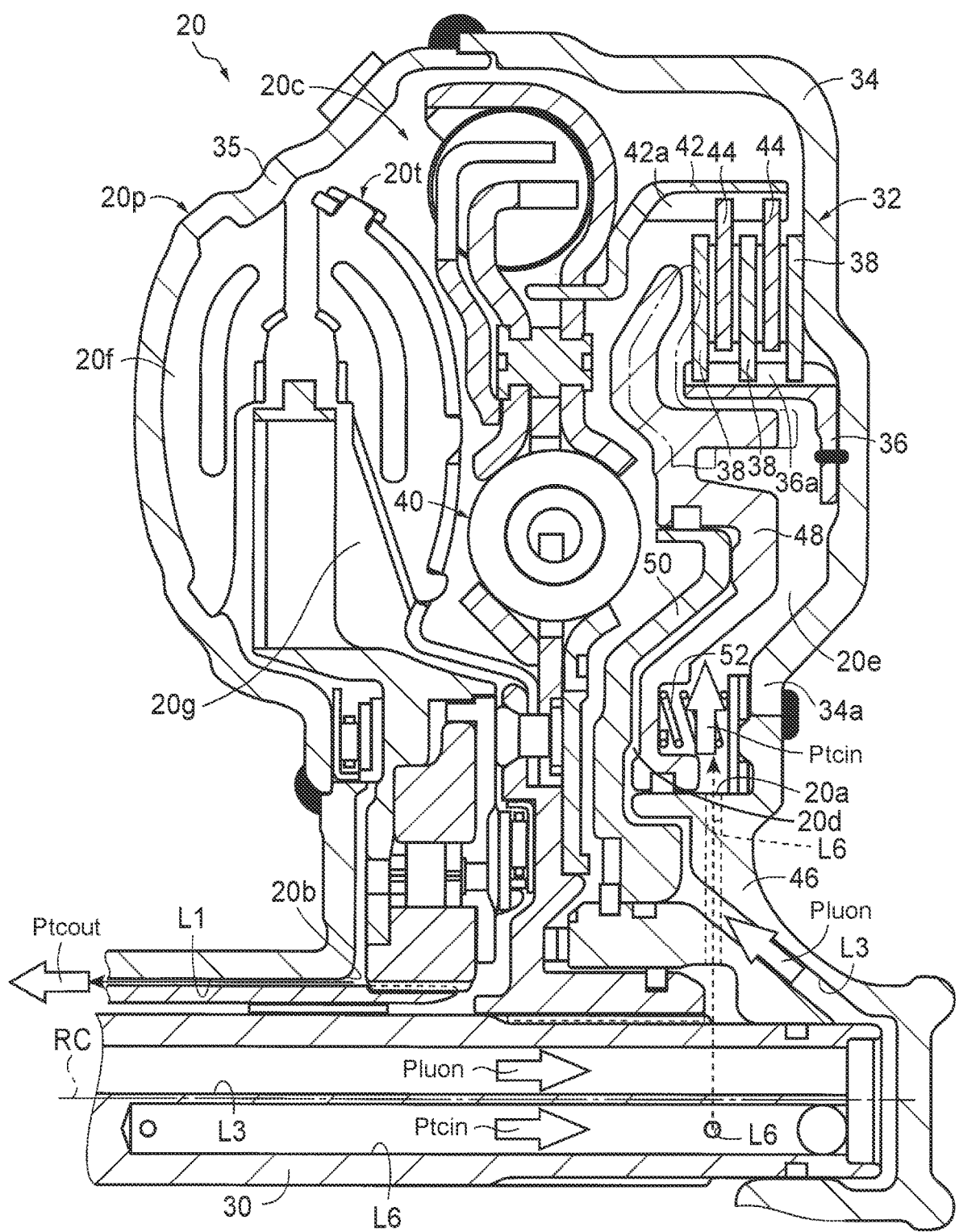
FIG. 3 is a schematic cross-sectional view illustrating the torque converter in FIG. 2 in detail.

FIG. 2 is a basic diagram illustrating an example of the torque converter 20 and the automatic transmission 22, and FIG. 3 is a schematic cross-sectional view illustrating the torque converter 20 in detail. The torque converter 20 and the automatic transmission 22 are configured generally symmetrically as to a shaft center RC of a transmission input shaft (turbine shaft) 30 that is an input-side rotating member of the automatic transmission 22, with the lower half of the shaft center RC omitted from illustration in FIG. 2. Also, in FIG. 3, the portion below the transmission input shaft 30 is omitted from illustration. The torque converter 20 is provided with a front cover 34 and a rear cover 35 that are welded together, a pump impeller 20$p$, and a turbine runner 20$t$. The pump impeller 20$p$ includes a plurality of pump vanes 20$f$ fixed on the inner side of the rear cover 35 and is linked with a crankshaft 12$a$ of the engine 12 so as to be capable of transmitting power and disposed so as to rotate about the shaft center RC. The turbine runner 20$t$ is disposed on the inner side of the rear cover 35 so as to face the rear cover 35 and is linked to the transmission input shaft 30 so as to be capable of transmitting power. The torque converter 20 is provided with a lockup clutch 32 that can directly link between the pump impeller 20$p$ and the turbine runner 20$t$, in other words between the crankshaft 12$a$ that is an input-side rotating member and the transmission input shaft 30 that is the output-side rotating member, by lockup control pressure Pslu (see FIG. 6) being supplied within a control hydraulic fluid chamber 20$d$. That is to say, the torque converter 20 functions as a vehicle fluid transmission device with a lockup clutch, which is provided on the power transmission path between the engine 12 and the automatic transmission 22. The power transmission device 16 is also provided with a mechanical oil pump 33 linked to the pump impeller 20$p$ so as to be capable of transmitting power. The oil pump 33 is rotationally driven by the engine 12 to generate hydraulic fluid pressure to perform gearshift control of the automatic transmission 22, engage the lockup clutch 32, supply lubricating oil to each part of the power transmission path of the power transmission device 16, and so forth.

The lockup clutch 32 is a hydraulic multi-plate friction clutch (wet multi-plate clutch). As shown in FIG. 3, the lockup clutch 32 is provided with a first annular member 36 fixed by welding to the front cover 34 that is integrally linked to the pump impeller 20$p$, and a plurality of (three in FIG. 3) annular first friction plates 38 that are engaged with outer perimeter spline teeth 36$a$ formed on the outer perimeter of the first annular member 36 so as to be incapable of relative rotation about the shaft center RC and to be movable in the shaft center RC direction (direction parallel to the shaft center RC). The lockup clutch 32 is also provided with a second annular member 42 that is linked to the transmission input shaft 30 and the turbine runner 20$t$ via a damper unit 40 provided within the torque converter 20, so as to be capable of transmitting power, and a plurality of (two in FIG. 3) annular second friction plates 44 that are disposed between the first friction plates 38 and that are engaged with inner perimeter spline teeth 42$a$ formed on the inner perimeter of the second annular member 42 so as to be incapable of relative rotation about on the shaft center RC and to be movable in the shaft center RC direction. The lockup clutch 32 is further provided with an annular pressing member (piston) 48 that is supported by a hub member 46 so as to be capable of moving in the shaft center RC direction, and that faces the front cover 34. The hub member 46 is fixed to an inner perimeter portion 34$a$ of the front cover 34 and supports an end portion of the transmission input shaft 30 at the front cover 34 side so as to be capable of rotating about the shaft center RC. The lockup clutch 32 is further provided with an annular fixing member 50 that is supported by the hub member 46 so as to be positionally fixed and that is disposed facing the pressing member 48 on the opposite side from the front cover 34 side such that the pressing member 48 is interposed between the annular fixing member 50 and the front cover 34. The lockup clutch 32 is further provided with a return spring 52 that biases the pressing member 48 toward the fixing member 50 side in the shaft center RC direction, i.e., biases the pressing member 48 in a direction so as to be distanced from the first friction plates 38 and the second friction plates 44 in the shaft center RC direction.

The torque converter 20 is provided with a main hydraulic fluid chamber (torque converter hydraulic fluid chamber) 20$c$ within the front cover 34 and the rear cover 35. Hydraulic operating fluid output from the oil pump 33 is supplied to the main hydraulic fluid chamber 20$c$ from a hydraulic operating fluid supply port 20$a$, and hydraulic operating fluid within the main hydraulic fluid chamber 20$c$ flows out from a hydraulic operating fluid outlet port 20$b$ (see the thick dashed line arrow in FIG. 6). Provided within the main hydraulic fluid chamber 20$c$ of the torque converter 20 are the lockup clutch 32, a control hydraulic fluid chamber 20$d$ which is supplied with lockup control pressure Pslu for engaging the lockup clutch 32, i.e., for biasing the pressing member 48 that presses the first friction plates 38 and the second friction plates 44 of the lockup clutch 32 toward the front cover 34 side, a front-side hydraulic fluid chamber 20$e$ which is supplied with second line hydraulic fluid pressure PL2 (see FIG. 6) for disengaging the lockup clutch 32, i.e., for biasing the pressing member 48 toward the opposite side from the front cover 34 side, and a rear-side hydraulic fluid chamber 20$g$ that communicates with the front-side hydraulic fluid chamber 20$e$ and is filled with the hydraulic operating fluid from the front-side hydraulic fluid chamber 20$e$, and from which the hydraulic operating fluid flows out through the hydraulic operating fluid outlet port 20$b$. Note that the control hydraulic fluid chamber 20$d$ is an oil tight space formed between the pressing member 48 and the fixing member 50, the front-side hydraulic fluid chamber 20$e$ is a space formed between the pressing member 48 and the front cover 34, and the rear-side hydraulic fluid chamber 20$g$ is the space in the main hydraulic fluid chamber 20$c$ excluding the control hydraulic fluid chamber 20$d$ and the front-side hydraulic fluid chamber 20$e$.

When the hydraulic fluid pressure of the hydraulic operating fluid supplied to the control hydraulic fluid chamber 20$d$, i.e., lockup-on pressure Pluon is relatively large (the hydraulic fluid pressure of the front-side hydraulic fluid chamber 20$e$, i.e., torque-converter-in pressure Ptcin is relatively small) in the torque converter 20, the pressing member 48 is biased and moves to the front cover 34 side as indicated by long dashed short dashed lines in FIG. 3. Accordingly, the pressing member 48 presses the first friction plates 38 and the second friction plates 44 into friction engagement, and the pump impeller 20$p$ linked to the first annular member 36 and the turbine runner 20$t$ linked to the second annular member 42 integrally rotate. That is to say, when the lockup clutch 32 is engaged in the torque converter 20, the pump impeller 20$p$ and the turbine runner 20$t$ are directly linked. Also, when the lockup-on pressure Pluon of the control hydraulic fluid chamber 20$d$ is relatively small (the torque-converter-in pressure Ptcin of the front-side hydraulic fluid chamber 20$e$ is relatively large) in the torque converter 20, the pressing member 48 moves to a position away from the first friction plates 38 as indicated by continuous lines, allowing the pump impeller 20$p$ linked to the first annular member 36 and the turbine runner 20$t$ linked to the second annular member 42 rotate relatively. That is to say, when the lockup clutch 32 is disengaged in the torque converter 20, the directly linked state of the pump impeller 20p and the turbine runner 20t is disengaged, and relative rotation is allowed.

The transmission torque of the lockup clutch 32 is controlled based on lockup differential pressure ΔPlu expressed by the following Expression (1), for example. The lockup differential pressure ΔPlu is differential pressure between the lockup-on pressure Pluon within the control hydraulic fluid chamber 20d and a lockup-off pressure that is an average value [(Ptcin+Ptcout)/2] of the torque-converter-in pressure Ptcin within the front-side hydraulic fluid chamber 20e and torque-converter-out pressure Ptcout that is hydraulic fluid pressure of the hydraulic operating fluid flowing out from the hydraulic operating fluid outlet port 20b. Expression (1) is an experimental expression decided through experiment and so forth in advance, and is set as appropriate in accordance with the structure of the torque converter 20 and so forth. Also, the torque-converter-in pressure Ptcin and the torque-converter-out pressure Ptcout in Expression (1) change depending on engine revolutions Ne, turbine rotations (rotations of the transmission input shaft 30) Nt, differential rotation ΔN (i.e., Ne−Nt) thereof, second line hydraulic fluid pressure PL2, engine torque Te, and so forth. Note that the torque-converter-out pressure Ptcout also changes due to the engine revolutions Ne, turbine rotations Nt, and so forth changing, and the centrifugal hydraulic fluid pressure within the rear-side hydraulic fluid chamber 20g of the torque converter 20 changing. The above-described lockup differential pressure ΔPlu is equivalent to lockup engagement pressure corresponding to transmission torque.

$$\Delta Plu=Pluon-(Ptcin+Ptcout)/2 \quad (1)$$

The lockup differential pressure ΔPlu of the lockup clutch 32 is controlled by an electronic control unit 56 via a hydraulic fluid pressure control circuit 54, and thereby the lockup clutch 32 is switched to one operating state out of a disengaged state where the lockup differential pressure ΔPlu is negative and the lockup clutch 32 is disengaged, a slip-engaged state where the lockup differential pressure ΔPlu is no less than zero and the lockup clutch 32 is halfway engaged with slippage, and a lockup state where the lockup differential pressure ΔPlu is maximum value and the lockup clutch 32 is completely engaged. That is to say, when the relation of Ptcin>Ptcout>Pluon is satisfied, the state is the disengaged state, and when the relation of Pluon>Ptcin>Ptcout is satisfied, the state is either the lockup state or the slip-engaged state in accordance with the lockup differential pressure ΔPlu. Note that in the torque converter 20, the front-side hydraulic fluid chamber 20e and the rear-side hydraulic fluid chamber 20g are the same chamber, i.e., the front-side hydraulic fluid chamber 20e and the rear-side hydraulic fluid chamber 20g communicate with each other at all times, regardless of whether the lockup clutch 32 is in the lockup state, the slip-engaged state, or the disengaged state, and the lockup clutch 32 is constantly cooled by the hydraulic operating fluid traveling from the hydraulic operating fluid supply port 20a toward the rear-side hydraulic fluid chamber 20g.

The automatic transmission 22 illustrated in FIG. 2 makes up a part of the power transmission path from the engine 12 to the drive wheels 14, and is a planetary gear multi-speed transmission that functions as a stepped automatic transmission where a plurality of gear positions (gearshift positions) with different gear ratios γ are formed by selectively engaging and disengaging a plurality of a first clutch C1 through a fourth clutch C4 that are hydraulic friction engagement devices, a first brake B1, and a second brake B2 (these will be referred to simply as "hydraulic friction engagement devices CB" when not distinguishing therebetween in particular). This arrangement is a stepped transmission that performs so-called clutch-to-clutch shifting, for example, which is often used in vehicles. The automatic transmission 22 includes a double-pinion first planetary gear 58, a second planetary gear 60, and a third planetary gear 62 disposed on the same axial line (on the shaft center RC). Rotations of the transmission input shaft 30 that is the input-side rotating member are changed in speed and output from the transmission output gear 24. Note that the second planetary gear 60 is a single-pinion gearset, while the third planetary gear 62 is a double-pinion gearset and is configured as a Ravigneaux gearset.

The first planetary gear 58 is provided with a first sun gear S1, a first ring gear R1 disposed concentrically with the first sun gear S1, a first pinion gear P1 that is made up of a pair of gears meshing with the first sun gear S1 and the first ring gear R1, and a first carrier CA1 that supports the first pinion gear P1 such that the first pinion gear P1 can rotate and revolve. The second planetary gear 60 is provided with a second sun gear S2, a second ring gear R2 disposed concentrically with the second sun gear S2, a second pinion gear P2 meshing with the second sun gear S2 and the second ring gear R2, and a second carrier CA2 that supports the second pinion gear P2 such that the second pinion gear P2 can rotate and revolve. The third planetary gear 62 is provided with a third sun gear S3, a third ring gear R3 disposed concentrically with the third sun gear S3, a third pinion gear P3 that is made up of a gear pair meshing with the third sun gear S3 and the third ring gear R3, and a third carrier CA3 that supports the third pinion gear P3 such that the third pinion gear P3 can rotate and revolve.

Linear solenoid valves SL1 through SL6 (see FIG. 1) are provided corresponding to the hydraulic actuators of the hydraulic friction engagement devices CB, and the linear solenoid valves SL1 through SL6 are controlled in accordance with gearshift control signals Sat output from the electronic control unit 56. Engaging/disengaging control of individual hydraulic friction engagement devices CB is performed, thereby forming gear positions for eight forward speeds and one reverse speed in accordance with accelerator operations of the driver, vehicle speed V, and so forth, as illustrated in the engagement schedule in FIG. 4. The "1st" through "8th" in FIG. 4 indicate the first speed gear position through the eighth speed gear position as forward gear positions, and "Rev" indicates the reverse gear position. In the forward gear positions, the gear ratios γ (i.e., transmission input shaft rotations NM/transmission output gear rotations Nout) become smaller stepwise from the first gear position "1st" at the low vehicle speed side toward the eighth gear position "8th" at the high vehicle speed side.

Figure 6:
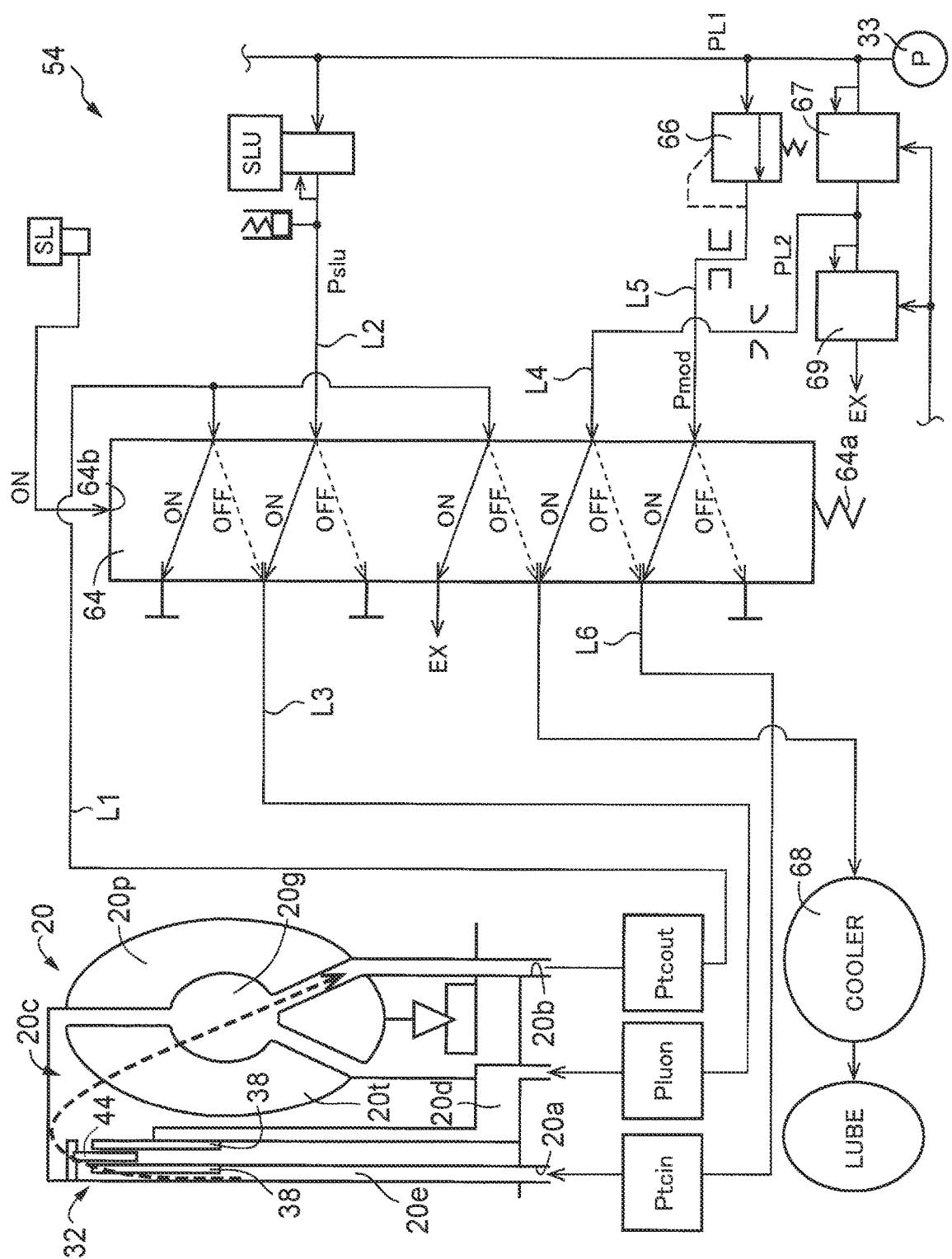
FIG. 6 is a hydraulic circuit diagram illustrating an example of a hydraulic control circuit including a linear solenoid valve SLU and so forth that control operations of the lockup clutch provided to the torque converter in FIG. 2.

FIG. 6 is a hydraulic circuit diagram for specifically exemplifying the portion of the lockup clutch 32 provided in the hydraulic fluid pressure control circuit 54 that is related to engaging/disengaging control. The hydraulic fluid pressure control circuit 54 includes a lockup control valve 64, a linear solenoid valve SLU that regulates a first line hydraulic fluid pressure PL1 that has been regulated by a relief-type first line pressure regulating valve 67 with hydraulic fluid pressure generated at the oil pump 33 as the source pressure, to lockup control pressure Pslu, and a modulator valve 66 that regulates to a constant modulator hydraulic fluid pressure Pmod with the first line hydraulic fluid pressure PL1 as the source pressure. The hydraulic fluid pressure control circuit 54 is provided with oil passages that supply the first line hydraulic fluid pressure PL1 to the linear solenoid valves SL1 through SL6. Note that in FIG. 6, while the first line hydraulic fluid pressure PL1 is used as the source pressure for the linear solenoid valve SLU, the modulator hydraulic fluid pressure Pmod may be used instead of the first line hydraulic fluid pressure PL1.

The lockup control valve 64 is a two-position switching valve that is switched from an OFF position to an ON position when ON hydraulic fluid pressure is supplied from an on/off solenoid valve SL. When the lockup control valve 64 is switched to the ON position, a first oil passage L1 is closed, a second oil passage L2 is connected to a third oil passage L3, the first oil passage L1 is connected to a discharge oil passage EX, a fourth oil passage L4 is connected to an oil cooler 68, and a fifth oil passage L5 is connected to a sixth oil passage L6, as indicated by a continuous line in FIG. 6. The first oil passage L1 is an oil passage where hydraulic operating fluid of the torque-converter-out pressure Ptcout output from the hydraulic operating fluid outlet port 20b of the torque converter 20 is guided. The second oil passage L2 is an oil passage where hydraulic operating fluid of the lockup control pressure Pslu that has been regulated by the linear solenoid valve SLU is guided. The third oil passage L3 is an oil passage where hydraulic operating fluid of the lockup-on pressure Pluon supplied to the control hydraulic fluid chamber 20d of the torque converter 20 is guided. The fourth oil passage L4 is an oil passage where hydraulic operating fluid of the second line hydraulic fluid pressure PL2 regulated by a second line pressure regulating valve 69, with the hydraulic fluid pressure relieved from the first line pressure regulating valve 67 as the source pressure, is guided. The fifth oil passage L5 is an oil passage where hydraulic operating fluid of the modulator hydraulic fluid pressure Pmod regulated to a constant value by the modulator valve 66 is guided. The sixth oil passage L6 is an oil passage where hydraulic operating fluid of the torque-converter-in pressure Ptcin supplied to the front-side hydraulic fluid chamber 20e of the torque converter 20 is guided.

Also, when the lockup control valve 64 is switched to the OFF position in accordance with the biasing force of a spring 64a, the first oil passage L1 is connected to the third oil passage L3, the second oil passage L2 is closed, the first oil passage L1 is connected to the oil cooler 68, the fourth oil passage L4 is connected to the sixth oil passage L6, and the fifth oil passage L5 is closed, as indicated by the dashed line in FIG. 6. The lockup control valve 64 is a spool valve, and is provided with the spring 64a that biases a spool valve member toward the OFF position side, and an ON-switching hydraulic fluid chamber 64b that accepts ON hydraulic fluid pressure output from the on/off solenoid valve SL to switch the spool valve member to the position ON side. In the lockup control valve 64, when supply of ON hydraulic fluid pressure from the on/off solenoid valve SL to the ON-switching hydraulic fluid chamber 64b is stopped, the spool valve member is held in the OFF position in accordance with the biasing force of the spring 64a, and when ON hydraulic fluid pressure is supplied from the on/off solenoid valve SL to the ON-switching hydraulic fluid chamber 64b, the spool valve member is held at the ON position against the biasing force of the spring 64a.

Due to the hydraulic fluid pressure control circuit 54 configured as described above, the operating state of the lockup clutch 32 is switched by the hydraulic operating fluid supplied from the lockup control valve 64 to the control hydraulic fluid chamber 20d and the front-side hydraulic fluid chamber 20e of the torque converter 20 being switched.

First, a situation where the lockup clutch 32 is in a lockup state or a slip-engaged state will be described. ON hydraulic fluid pressure is output from the on/off solenoid valve SL in accordance with a lockup control signal Slu output from the electronic control unit 56, and when the ON hydraulic fluid pressure is supplied to the ON-switching hydraulic fluid chamber 64b, the lockup control valve 64 is switched to the ON position. Accordingly, hydraulic operating fluid regulated to the lockup control pressure Pslu is supplied from the third oil passage L3 to the control hydraulic fluid chamber 20d of the torque converter 20 as hydraulic operating fluid of the lockup-on pressure Pluon, while hydraulic operating fluid regulated to the modulator hydraulic fluid pressure Pmod is supplied from the sixth oil passage L6 to the front-side hydraulic fluid chamber 20e of the torque converter 20 as hydraulic operating fluid of the torque-converter-in pressure Ptcin, and hydraulic operating fluid of the torque-converter-out pressure Ptcout is discharged from the first oil passage L1 to the discharge oil passage EX. Here, the relation in magnitude among the lockup-on pressure Pluon, the torque-converter-in pressure Ptcin, and the torque-converter-out Ptcout is Pluon>Ptcin>Ptcout. Thus, when the lockup-on pressure Pluon of the control hydraulic fluid chamber 20d of the torque converter 20, i.e., the lockup control pressure Pslu, is regulated by the linear solenoid valve SLU in accordance with the lockup control signal Slu, the lockup differential pressure ΔPlu corresponding to the lockup engagement pressure is regulated, and the operating state of the lockup clutch 32 is controlled in a range of the slip-engaged state or lockup state (completely engaged state). In the slip-engaged state, the lockup differential pressure ΔPlu, and further the slippage amount ΔN of the lockup clutch 32, can be continuously adjusted by controlling the lockup control pressure Pslu. In the slip-engaged state, the differential rotation ΔN of the engine revolutions Ne and the turbine rotations Nt is equivalent to the slippage amount.

Next, a situation where the lockup clutch 32 is in a disengaged state will be described. When output of ON hydraulic fluid pressure from the on/off solenoid valve SL is stopped in accordance with the lockup control signal Slu, and supply of ON hydraulic fluid pressure to the ON-switching hydraulic fluid chamber 64b is stopped, the spool valve member is moved in accordance with the biasing force of the spring 64a, and the lockup control valve 64 is switched to the OFF position. Accordingly, the hydraulic operating fluid of the torque-converter-out pressure Ptcout flowing from the hydraulic operating fluid outlet port 20b of the torque converter 20 is supplied to the control hydraulic fluid chamber 20d of the torque converter 20 as hydraulic operating fluid of the lockup-on pressure Pluon via the first oil passage L1 and the third oil passage L3 and the second line hydraulic fluid pressure PL2 is supplied to the front-side hydraulic fluid chamber 20e of the torque converter 20 as hydraulic operating fluid of the torque-converter-in pressure Ptcin from the sixth oil passage L6. Also, part of the hydraulic operating fluid of the torque-converter-out pressure Ptcout flowing from the hydraulic operating fluid outlet port 20b is supplied from the first oil passage L1 to the oil cooler 68. Here, the relation in magnitude among the lockup-on pressure Pluon, the torque-converter-in pressure Ptcin, and the torque-converter-out pressure Ptcout is Ptcin>Ptcout>Pluon. Accordingly, the operating state of the lockup clutch 32 is switched to a disengaged state.

Note that while the torque converter 20 described above includes a three-port structure that includes the hydraulic operating fluid supply port 20a, the hydraulic operating fluid outlet port 20b, and a port that supplies the lockup control pressure Pslu to the control hydraulic fluid chamber 20d and engages/disengages the multi-plate lockup clutch 32 by moving the pressing member 48, a torque converter including a two-port structure can be employed as well. Also, a single-plate lockup clutch can be employed instead of the multi-plate lockup clutch 32. Also, although the lockup differential pressure ΔPlu that is lockup engaging pressure is controlled by the lockup control pressure Pslu (lockup-on pressure Pluon), a configuration may be made where the lockup engagement pressure can be directly controlled by a linear solenoid valve or the like. In this way, fluid transmission devices including lockup clutches of various structures can be employed.

Figure 7:
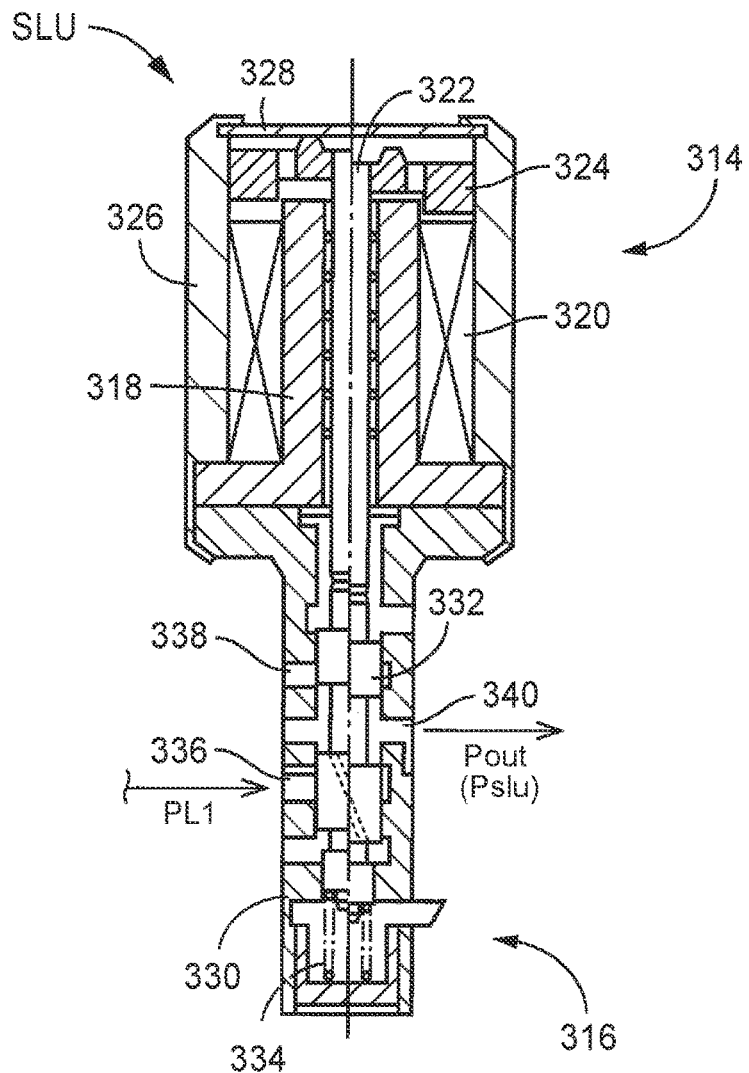
FIG. 7 is a schematic cross-sectional view illustrating an example of the linear solenoid valve SLU in FIG. 6.
Figure 8:
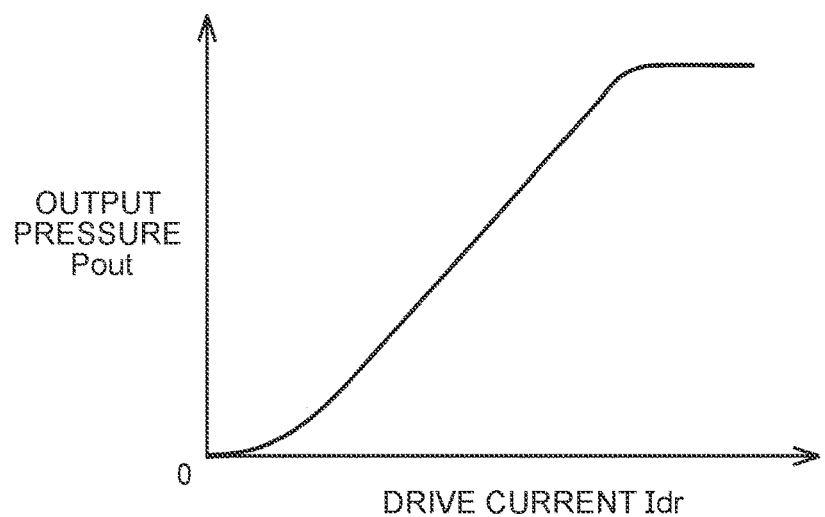
FIG. 8 is a diagram illustrating an example of output pressure characteristics of the linear solenoid valve SLU.

FIG. 7 is a schematic cross-sectional view illustrating an example of the linear solenoid valve SLU. The linear solenoid valve SLU is provided with a solenoid unit 314 that is a device that converts electric energy into driving force by electric power being applied thereto, and a pressure regulating unit 316 that regulates the pressure of the first line hydraulic fluid pressure PL1 that is input pressure by driving of the solenoid unit 314 to generate a predetermined output pressure Pout, i.e., the lockup control pressure Pslu. The solenoid unit 314 is made up of a cylindrical winding core 318, a coil 320 wound on the outer perimeter side of the winding core 318, a core 322 disposed within the winding core 318 so as to be movable in the axial direction, a plunger 324 fixed on the end portion of the core 322, which is the opposite side from the pressure regulating unit 316, a casing 326 that accommodates each of the winding core 318, the coil 320, the core 322, and the plunger 324, and a cover 328 fit into the opening of the casing 326. The pressure 670 regulating unit 316 is made up of a sleeve 330 fit onto the casing 326, a spool 332 provided within the sleeve 330 so as to be movable in the axial direction, and a spring 334 that biases the spool 332 toward the solenoid unit 314. The end portion of the spool 332 toward the solenoid unit 314 side abuts the end portion of the core 322 toward the pressure regulating unit 316 side. In the linear solenoid valve SLU configured as described above, when drive current Idr is applied to the coil 320, the plunger 324 is moved in the axial direction that is common to the core 322 and the spool 332, in accordance with the current value thereof, and thus the core 322, and further the spool 332, are moved in the same direction. Thus, the flow of hydraulic operating fluid input from an input port 336 and the flow of hydraulic operating fluid discharged from a drain port 338 are adjusted, and the first line hydraulic fluid pressure PL1 input from the input port 336 is regulated to a predetermined output pressure Pout corresponding to the drive current Idr and is output from an output port 340, in accordance with the valve characteristics exhibiting the relation between the drive current Idr and the output pressure Pout illustrated in FIG. 8, for example. Note that the linear solenoid valves SL1 through SL6 are also basically of the same configuration as the linear solenoid valve SLU.

Returning to FIG. 1, the vehicle 10 is provided with the electronic control unit 56 serving as a controller that executes lockup clutch control where the lockup control pressure Pslu of the lockup clutch 32, i.e., the lockup differential pressure ΔPlu is controlled, gearshift control to control the engagement pressure of the hydraulic friction engagement devices CB when the automatic transmission 22 shifts gears, and so forth, via the hydraulic fluid pressure control circuit 54, for example. The electronic control unit 56 also serves as a controller that controls output (torque) of the engine 12. FIG. 1 is a diagram illustrating an input/output system of the electronic control unit 56, and is a functional block diagram illustrating main components of control functions of the electronic control unit 56. The electronic control unit 56 is configured including a so-called microcomputer that is provided with, for example, a central processing unit (CPU), random access memory (RAM), read-only memory (ROM), an input/output interface, and so forth. The CPU executes various types of control of the vehicle 10 by performing signal processing following a program stored in the ROM in advance while using temporary storage functions of the RAM. A separate electronic control unit may be provided for engine control, for gearshift control, and so forth.

The electronic control unit 56 is supplied with signals representing various types of information detected by various types of sensors with which the vehicle 10 is provided. For example, signals representing a throttle valve opening degree θth, signals representing a vehicle speed V, signals representing an accelerator operation amount θacc, signals representing a first hydraulic operating fluid temperature T1oil, signals representing a second hydraulic operating fluid temperature T2oil, signals representing revolutions (engine revolutions) Ne of the engine 12, signals representing rotations (turbine rotations) Nt, and so forth, are input to the electronic control unit 56. Here, the signals representing the throttle valve opening degree θth are detected by a throttle valve opening degree sensor 70. The signals representing the vehicle speed V are detected by a vehicle speed sensor 72. The signals representing the accelerator operation amount θacc are detected by an accelerator operation amount sensor 74. The signals representing the first hydraulic operating fluid temperature T1oil indicate the temperature of the hydraulic operating fluid of the hydraulic fluid pressure control circuit 54, detected by a first hydraulic fluid temperature sensor 76. The signals representing the second hydraulic operating fluid temperature T2oil indicate the temperature of the hydraulic operating fluid of the hydraulic fluid pressure control circuit 54, detected by a second hydraulic fluid temperature sensor 77. The signals representing the revolutions Ne of the engine 12 are detected by an engine revolution sensor 78. The vehicle speed sensor 72 is disposed so as to detect transmission output gear rotations Nout, which is the rotational speed of the transmission output gear 24, for example, and can calculate the vehicle speed V from the transmission output gear rotations Nout. The turbine rotations Nt are the same as the transmission input shaft rotations Nin which is the rotational speed of the transmission input shaft 30. The first hydraulic operating fluid temperature T1oil is the hydraulic operating fluid temperature at the downstream side from the lockup clutch 32 in the hydraulic fluid pressure control circuit 54, and is the temperature of the hydraulic operating fluid flowing out from the hydraulic operating fluid outlet port 20b of the torque converter 20, for example. The second hydraulic operating fluid temperature T2oil is the hydraulic operating fluid temperature at the upstream side from the lockup clutch 32 in the hydraulic fluid pressure control circuit 54, and is the temperature of the hydraulic operating fluid supplied to the hydraulic operating fluid supply port 20a of the torque converter 20, for example.

On the other hand, engine control signals Se, gearshift control signals Sat, lockup control signals Slu, and so forth, are output from the electronic control unit 56. Here, the engine control signals Se are signals for controlling operations of the engine 12. The gearshift control signals Sat are signals for hydraulic fluid pressure control relating to gearshift operations of the automatic transmission 22. The lockup control signals Slu are signals for switching control of the operating state of the lockup clutch 32. The engine control signals Se are control signals for performing opening/closing control of an electronic throttle valve, control of fuel injection amount by fuel injectors, ignition timing control, and so forth, and control the torque of the engine 12, for example. The gearshift control signals Sat are control signals for driving the linear solenoid valves SL1 through SL6 for engaging/disengaging control of the hydraulic friction engagement devices CB. Also, the lockup control signals Slu are control signals for driving the linear solenoid valve SLU to regulate the lockup control pressure Pslu, and control signals for driving the on/off solenoid valve SL to output ON hydraulic fluid pressure.

The electronic control unit 56 is functionally provided with an engine control unit 100, a gearshift control unit 102, and a lockup clutch control unit 110. The engine control unit 100 basically performs output control of the engine 12 based on the accelerator operation amount θacc, the vehicle speed V, and so forth. The gearshift control unit 102 determines gearshift operations following a gearshift map (gearshift conditions) set in advance, with the vehicle speed V and output request amounts such as the accelerator operation amount θacc and so forth as parameters, for example, automatically shifts gear positions of the automatic transmission 22 as necessary, and also performs manual gearshift of shifting gear positions of the automatic transmission 22 in accordance with gearshift instructions from the driver by a shift lever or the like. The gearshift control is carried out by performing engaging/disengaging control of the hydraulic friction engagement devices CB via the linear solenoid valves SL1 through SL6. The hydraulic fluid pressure of disengaged-side friction engagement devices is reduced according to a change pattern set in advance, and the hydraulic fluid pressure of engaged-side friction engagement devices is increased according to a change pattern set in advance.

Figures 4, 5:
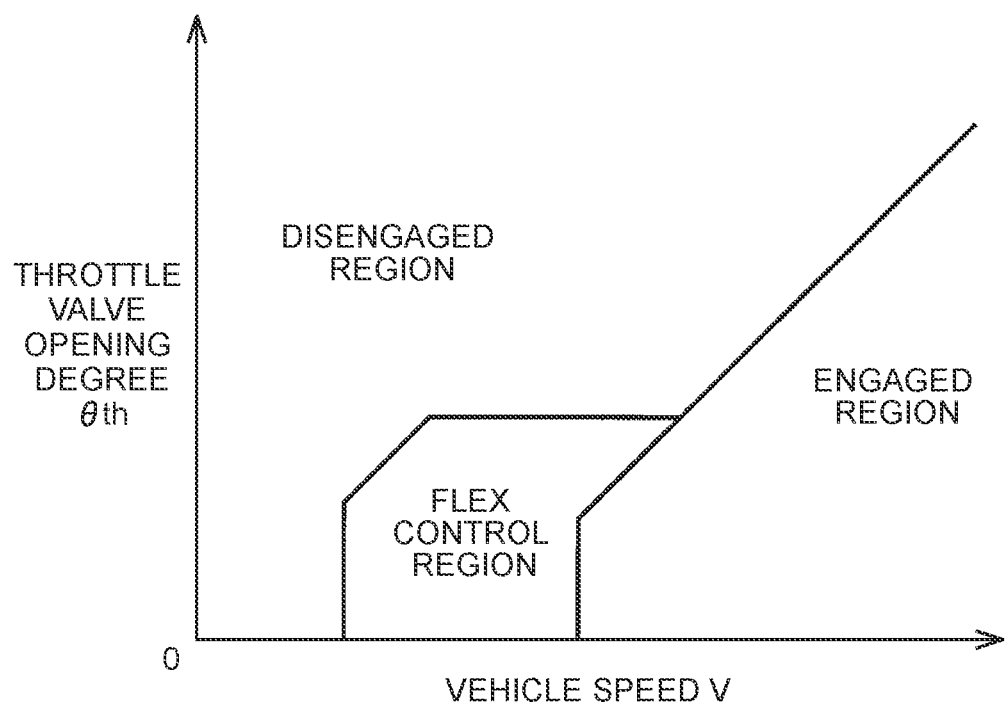
FIG. 4 is an engagement schedule illustrating a plurality of gear positions realized by the automatic transmission in FIG. 2, and a hydraulic friction engagement device that realizes the gear positions.
FIG. 5 is a diagram illustrating an example of a switching map of disengaged region, engaged region, and flex control region of the lockup clutch provided to the torque converter in FIG. 2.

The lockup clutch control unit 110 performs switching control of the operating state of the lockup clutch 32, and functions as a lockup control device. The lockup clutch control unit 110 functionally is provided with a complete lockup control unit 112, a flex lockup control unit 114, and a target differential rotation correction unit 116. The lockup clutch control unit 110 executes lockup control where the lockup differential pressure ΔPlu of the lockup clutch 32, i.e., the lockup control pressure Pslu, is controlled. The lockup clutch control unit 110 switches the operating state of the lockup clutch 32 following lockup switching rules set in advance, with the operating state such as the vehicle speed V and the throttle valve opening degree θth, and so forth, as parameters, for example. FIG. 5 is an example of a switching map which is the lockup switching rules, and is divided into three regions of a disengaged region for a disengaged state, a flex control region for a slip-engaged state, and an engaged region for a lockup state, with the vehicle speed V and the throttle valve opening degree θth as parameters. For example, the engaged region is set to the high-vehicle-speed side, the disengaged region is set to the low-vehicle-speed side, and the flex control region is set in a region between the engaged region and disengaged region, where the throttle valve opening degree θth is small. Determination is made regarding which region of the disengaged region, the flex control region, and the engaged region that the current state corresponds to, based on the actual vehicle speed V and throttle valve opening degree θth, and controls the lockup control signal Slu so that the lockup clutch 32 realizes the operating state corresponding to the region that has been determined. The linear solenoid valve SLU and the on/off solenoid 785 valve SL provided to the hydraulic fluid pressure control circuit 54 are driven (operated) in accordance with this lockup control signal Slu, thereby controlling the operating state of the lockup clutch 32 to the operating state corresponding to the region that has been determined. Note that the throttle valve opening degree θth may be substituted by the accelerator operation amount θacc, requested driving force, engine output, or the like.

The complete lockup control unit 112 executes lockup control for complete engagement of the lockup clutch 32 when the lockup clutch control unit 110 determines that the driving state of the vehicle 10 (vehicle speed V and throttle valve opening degree θth) is in the engaged region of the switching map. Specifically, the lockup control signal Slu is output so that the ON hydraulic fluid pressure from the on/off solenoid valve SL is output and the lockup control valve 64 is maintained at the ON position, and so that the lockup control pressure Pslu regulated by the linear solenoid valve SLU is maximum pressure. Thus, the lockup clutch 32 is in a lockup state where the pump impeller 20$p$ and the turbine runner 20$t$ are directly linked (lockup-on).

The flex lockup control unit 114 executes flex lockup control for a 800 slip-engaged state of the lockup clutch 32 when the lockup clutch control unit 110 determines that the driving state of the vehicle 10 (vehicle speed V and throttle valve opening degree θth) is in the flex control region of the switching map. Specifically, the lockup control signal Slu is output to control the lockup control pressure Pslu (lockup-on pressure Pluon) regulated by the linear solenoid valve SLU so that the differential rotation 805 (slippage amount) ΔN between the pump impeller 20$p$ and the turbine runner 20$t$ is the target differential rotation ΔN* set in advance without the lockup clutch 32 being completely engaged. In this flex lockup control as well, the ON hydraulic fluid pressure from the on/off solenoid valve SL is output by the lockup control signal Slu and the lockup control valve 64 is maintained at the ON position. Thus, the lockup clutch 32 is in a slip-engaged state where the differential rotation ΔN between the pump impeller 20$p$ and the turbine runner 20$t$ is the target differential rotation ΔN*. The target differential rotation ΔN* is read in from the target differential rotation correction unit 116.

When the lockup clutch control unit 110 determines that the driving state of the vehicle 10 (vehicle speed V and throttle valve opening degree θth) is in the disengaged region of the switching map, the lockup clutch control unit 110 executes lockup clutch disengaging control to control the lockup clutch 32 to a disengaged state. Specifically, the lockup control signal Slu is output to stop output of the ON hydraulic fluid pressure from the on/off solenoid valve SL. Thus, the lockup control valve 64 is maintained at the OFF position, and the lockup clutch 32 is in a disengaged state.

The target differential rotation correction unit 116 performs correction processing on a target differential rotation initial value ΔN*i set in advance, following steps S1 through S8 (hereinafter "step" will be omitted, and shortened to simply S1 through S8) in the flowchart in FIG. 9, to calculate the target differential rotation ΔN* used in the flex lockup control executed by the flex lockup control unit 114. In the first embodiment, correction is executed in accordance with a correction coefficient Kq relating to a heat accumulation amount Qa, a correction coefficient Ke relating to past correction history by locality, a correction coefficient Ko relating to a degree of oxidative deterioration of hydraulic operating fluid, and a correction coefficient Kf relating to an amount of inclusion of foreign matter in the hydraulic operating fluid. The target differential rotation initial value ΔN*i may be set to a certain value in advance by experiment and the like based on fuel consumption, noise-and-vibration (NV) performance, durability of the friction plates 38 and 44 of the lockup clutch 32, and so forth, or may be set to be variable in accordance with the driving state of the vehicle 10 and so forth. The first friction plates 38 and the second friction plates 44 correspond to the friction members of the lockup clutch 32.

Figure 9:
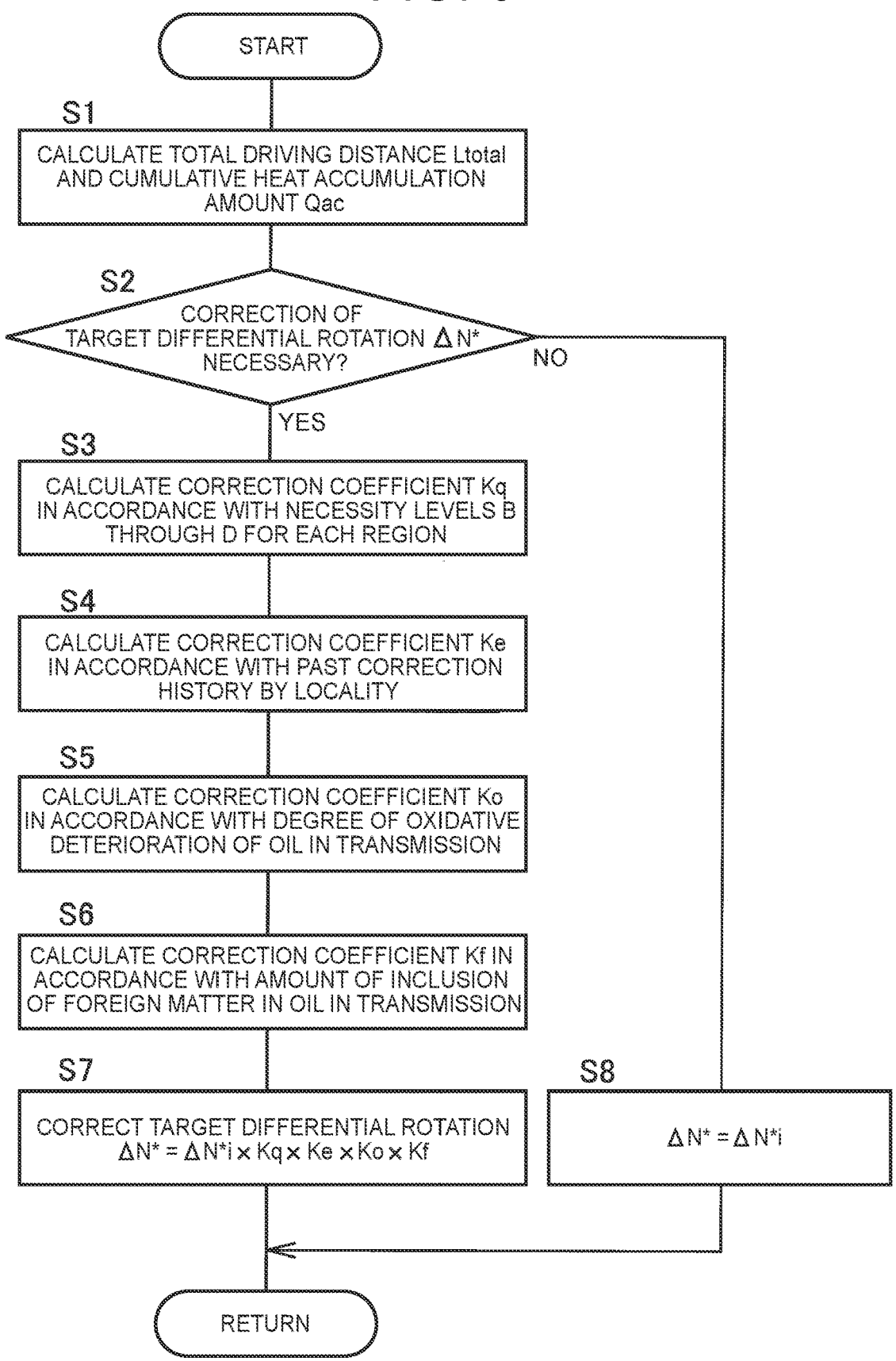
FIG. 9 is a flowchart illustrating in detail correction processing executed by a target differential rotation correction unit of an electronic control unit in FIG. 1.

S1 through S8 in FIG. 9 are constantly executed while the vehicle 10 is being driven, regardless of whether flex traveling is being performed, which is traveling in a state where the lockup clutch 32 is slip-engaged by the flex lockup control unit 114. In S1, a total driving distance Ltotal of the vehicle 10 is calculated, and a cumulative heat accumulation amount Qac, where the heat accumulation amount Qa generated at the first friction plates 38 and the second friction plates 44 is cumulated, is calculated. The total driving distance Ltotal is the driving distance from the vehicle 10 shipping, and may be calculated by cumulating distance from the vehicle speed V, or alternatively, the value of an odometer or the like may be used as it is. The heat accumulation amount Qa is found by subtracting heat dissipation amount Qr from heat generation amount Qh as shown in the following Expression (2), and the cumulative value EQa, obtained by successively cumulating the heat accumulation amount Qa, is stored in a recording medium or the like as the cumulative heat accumulation amount Qac. Note that the heat accumulation amount Qa, the heat generation amount Qh, and the heat dissipation amount Qr are all estimated values.

$$Qa=Qh-Qr \quad (2)$$

The heat generation amount Qh is the amount of heat generated by sliding friction between the first friction plates 38 and the second friction plates 44, and is calculated by the following Expression (3), using heat generation gain Kheat, transmission torque Tlu of the lockup clutch 32, and differential rotation ΔN of the lockup clutch 32, for example. The heat generation gain Kheat is set in accordance with the differential rotation ΔN, following a map or the like set in advance, where the larger the differential rotation ΔN is, the larger the value of Kheat is, for example. The transmission torque Tlu can be calculated from the following Expression (4), using engine torque Te that can be found with the throttle valve opening degree θth and the engine revolutions Ne as parameters, the engine revolutions Ne, and a capacity coefficient c of the torque converter 20, for example. The capacity coefficient c is obtained from a performance curve of the torque converter 20 set in advance. Note that this is one example of the method of calculating the heat generation amount Qh, and may be changed as appropriate.

$$Qh=Kheat \times Tlu \times \Delta N \quad (3)$$

$$Tlu=Te-c \times Ne^e \quad (4)$$

Also, the heat dissipation amount Qr is the amount of heat that the hydraulic operating fluid of the hydraulic fluid pressure control circuit 54 flowing past the lockup clutch 32 draws away from the first friction plates 38 and the second friction plates 44, and is calculated by the following Expression (5), using a heat dissipation gain Kcool, a friction member estimated temperature T0 that is the estimated temperature of the first friction plates 38 and the second friction plates 44, the second hydraulic operating fluid temperature T2oil, and a constant A set in advance, for example. The heat dissipation gain Kcool is set in accordance with the turbine rotations Nt, following a map or the like set in advance, where the greater the turbine rotations Nt is, the larger the value of Kcool is, for example. The friction member estimated temperature T0 is calculated based on the thermal capacity, the heat generation amount Qh, the heat dissipation amount Qr, and so forth of the first friction plates 38 and the second friction plates 44 of the lockup clutch 32, for example, but may be substituted with the first hydraulic operating fluid temperature T1oil instead. Note that this is one example of the method of calculating the heat dissipation amount Qr, and may be appropriately changed as necessary.

$$Qr=Kcool \times [(T0-T2oil)-A] \quad (5)$$

Figure 10:
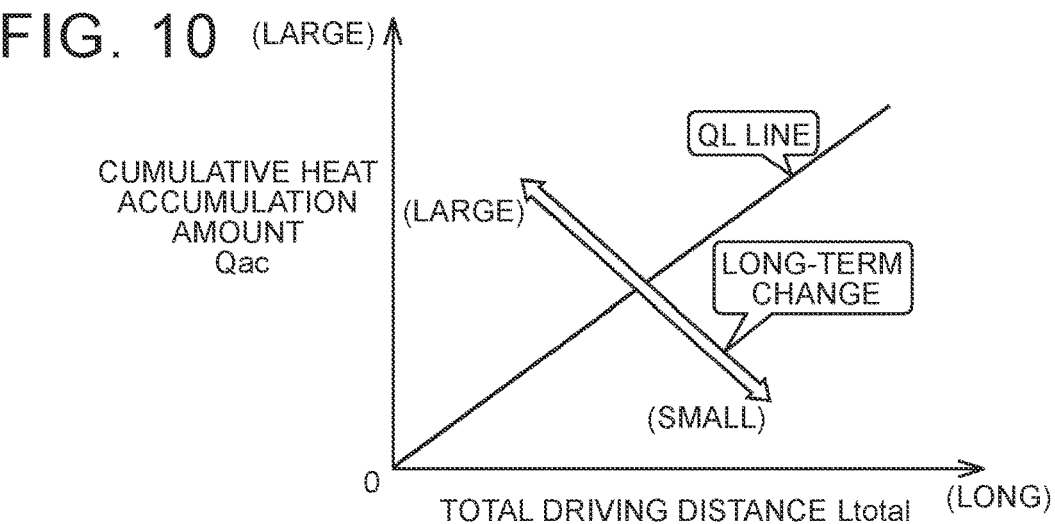
FIG. 10 is a diagram exemplifying a QL line set in advance as secured performance of the lockup clutch.

In S2 in FIG. 9, the long-term change that is a change of the cumulative heat accumulation amount Qac as to the total driving distance Ltotal is used as transition of the heat accumulation amount Qa, and determination is made regarding whether correction of the target differential rotation ΔN* is necessary, based on the long-term change. That is to say, the QL line illustrated in FIG. 10, for example, is set as secured performance of the lockup clutch 32 relating to the long-term change of the heat accumulation amount Qa. The QL line is set as a straight line on two-dimensional coordinates of the total driving 890 distance Ltotal and the cumulative heat accumulation amount Qac, indicating that cumulative heat accumulation amount Qac below the QL line is within a secured range, and accordingly little or no correction is necessary. On the other hand, when the cumulative heat accumulation amount Qac increases to above the QL line, this means that durability is not secured, and accordingly correction is necessary. The magnitude of the long-term change of the heat accumulation amount Qa in the two-dimensional coordinates of the total driving distance Ltotal and the cumulative heat accumulation amount Qac is larger when the larger the cumulative heat accumulation amount Qac is and the shorter the total driving distance Ltotal is, and is smaller when the smaller the cumulative heat accumulation amount Qac is and the longer the total driving distance Ltotal is, as illustrated in FIG. 10. The larger the long-term change is, the higher the necessity of correction is, and the smaller the long-term change is, the lower the necessity of correction is.

Figure 11:
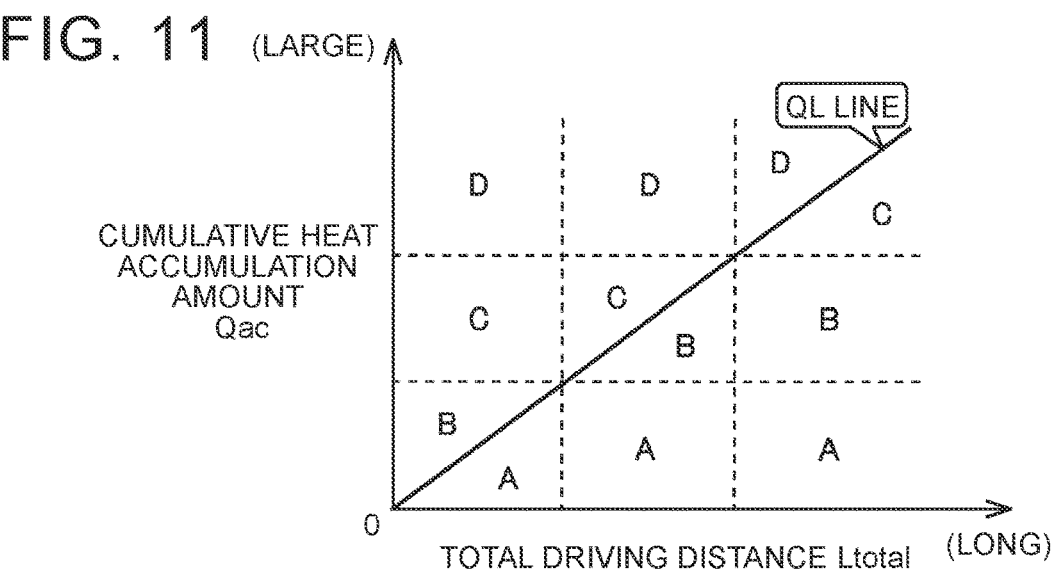
FIG. 11 is a diagram illustrating an example of necessity levels A through D for correction, set in advance of each of a plurality of regions, in order to determine necessity of correction of target differential rotation in step S2 of FIG. 9.

FIG. 11 is a map where the two-dimensional coordinates of the total driving distance Ltotal and the cumulative heat accumulation amount Qac have been sectioned into a plurality of regions by dashed lines, and correction necessity levels A through D have been set for each region, based on the necessity for correction according to the QL line that is secured performance, and the magnitude in the long-term change of the heat accumulation amount Qa. The correction necessity levels A through D have been set in accordance with the magnitude in the long-term change of the heat accumulation amount Qa, with the magnitude of necessity for correction following the relation of A<B<C<D. That is to say, correction is unnecessary in the region of necessity level A, while correction is necessary in the regions of necessity levels B through D. In S2, determination is made regarding whether correction is necessary, based on the correction necessity map in FIG. 11. Accordingly, when the transition point of the cumulative heat accumulation amount Qac as to the total driving distance Ltotal at the current point in time belongs to a region of necessity level A, correction is unnecessary and it is determined as NO (negative) in S2, and accordingly in S8, the target differential rotation initial value ΔN*i is used as the target differential rotation ΔN* without change. Accordingly, the flex lockup control unit 114 performs flex lockup control using the target differential rotation $\Delta N^*$ (i.e., $\Delta N^*i$).

On the other hand, when the transition point of the cumulative heat accumulation amount Qac as to the total driving distance Ltotal at the current point in time belongs to one of the regions of necessity levels B through D, correction is necessary and it is determined as YES (positive) in S2, and accordingly S3 and thereafter are executed following S2. In S3, the correction coefficient Kq is calculated following the correction rules set in advance in accordance with the necessity levels B through D. The correction coefficient Kq is a coefficient for obtaining the target differential rotation $\Delta N^*$ by being multiplied with the target differential rotation initial value $\Delta N^*i$, and is set within a range of $0 \leq Kq \leq 1.0$. Correction coefficient Kq=1.0 means no correction, and accordingly the target differential rotation initial value $\Delta N^*i$ continues to be used without change, and the target differential rotation $\Delta N^* = \Delta N^*i$ is set. The smaller the correction coefficient Kq is, the larger the downward correction amount of the target differential rotation $\Delta N^*$ is. Correction coefficient Kq=0 means that the target differential rotation $\Delta N^*=0$, where the lockup clutch 32 is completely engaged and is in a lockup state. This holds true for the other correction coefficients Ke, Ko, and Kf, as well.

Figure 12:
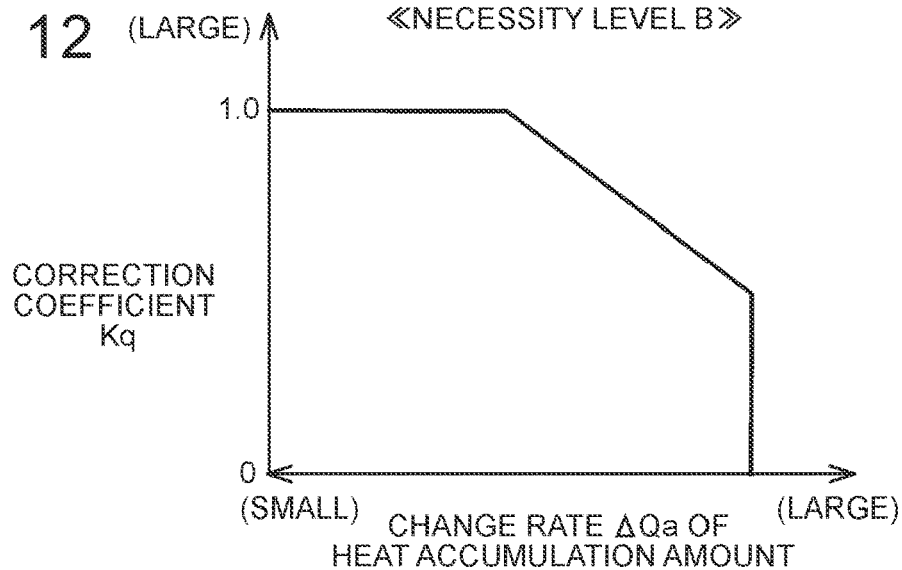
FIG. 12 is a diagram illustrating an example of a correction coefficient map used in a case of necessity level B, when calculating a correction coefficient Kq in accordance with necessity levels B through D for each region in step S3 in FIG. 9.
Figure 13:
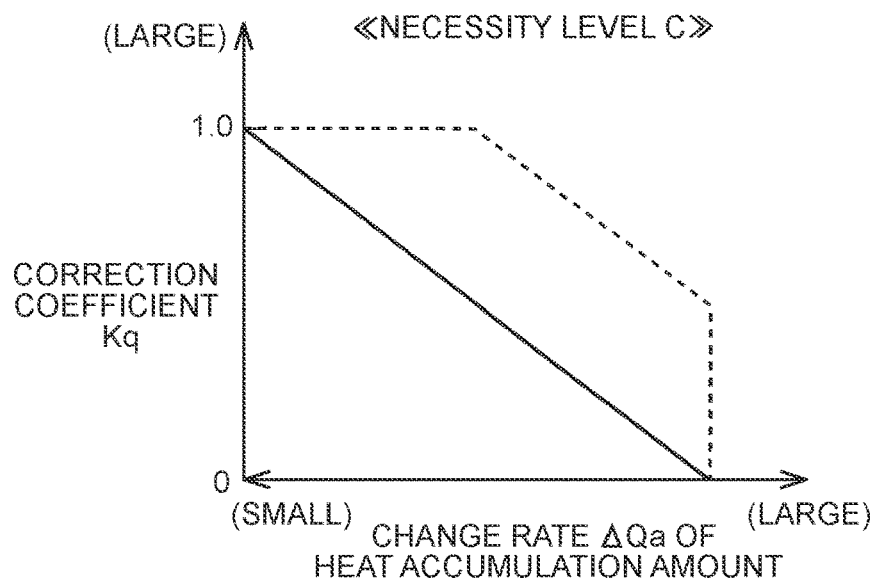
FIG. 13 is a diagram illustrating an example of a correction coefficient map used in a case of necessity level C, when calculating the correction coefficient Kq in accordance with necessity levels B through D for each region in step S3 in FIG. 9.
Figure 14:
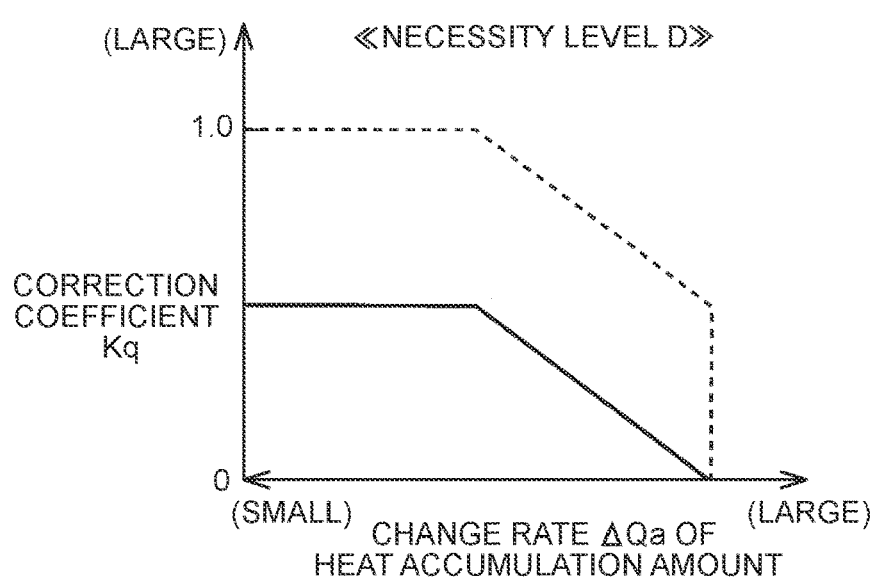
FIG. 14 is a diagram illustrating an example of a correction coefficient map used in a case of necessity level D, when calculating the correction coefficient Kq in accordance with necessity levels B through D for each region in step S3 in FIG. 9.

A certain value may be set for the correction coefficient Kq in accordance with the necessity levels B through D for the correction rules, but in the first embodiment, the correction coefficient Kq is calculated in accordance with a change rate $\Delta Qa$ of the heat accumulation amount Qa at the current point in time, following a correction coefficient map set in advance for each necessity level B through D, as illustrated in FIGS. 12 through 14. The change rate $\Delta Qa$ of the heat accumulation amount Qa is the amount of change of the heat accumulation amount Qa per unit time. Each of the correction coefficient maps is set such that when the change rate $\Delta Qa$ is large, the correction coefficient Kq is small as compared to when the change rate $\Delta Qa$ is small, i.e., so that the downward correction amount of the target differential rotation $\Delta N^*$ is large. The correction coefficient maps are also set such that the magnitude of the correction coefficient Kq is in a relation of B>C>D, i.e., such that the downward correction amount of the target differential rotation $\Delta N^*$ is in a relation of B<C<D in accordance with necessity for correction at the necessity levels B through D. The dashed lines in FIGS. 13 and 14 indicate the correction coefficient map of the necessity level B illustrated in FIG. 12 for comparison.

Describing the above correction coefficient maps in detail, for necessity level B in FIG. 12, there is no correction (Kq=1.0) while the change rate $\Delta Qa$ of the heat accumulation amount Qa is small, and as the change rate $\Delta Qa$ increases, the correction coefficient Kq is gradually reduced in accordance with the increase in the change rate $\Delta Qa$. For necessity level C in FIG. 13, the correction coefficient Kq is gradually reduced in accordance with the increase in the change rate $\Delta Qa$ from the time that the change rate $\Delta Qa$ of the heat accumulation amount Qa is small. For necessity level D in FIG. 14, the correction coefficient Kq is small even when the change rate $\Delta Qa$ of the heat accumulation amount Qa is small, and as the change rate $\Delta Qa$ increases, the correction coefficient Kq is gradually reduced even further in accordance with the increase in the change rate $\Delta Qa$. In the first embodiment, the processing of the correction coefficient Kq being obtained in accordance with the change rate $\Delta Qa$ of the heat accumulation amount Qa in S3, following the correction coefficient maps set regarding the necessity levels B through D, and calculating the target differential rotation $\Delta N^*$ in S7 using the correction coefficient Kq, is equivalent to the heat accumulation amount-based correction of correcting the target differential rotation $\Delta N^*$ based on transition of the heat accumulation amount Qa.

Figure 15:
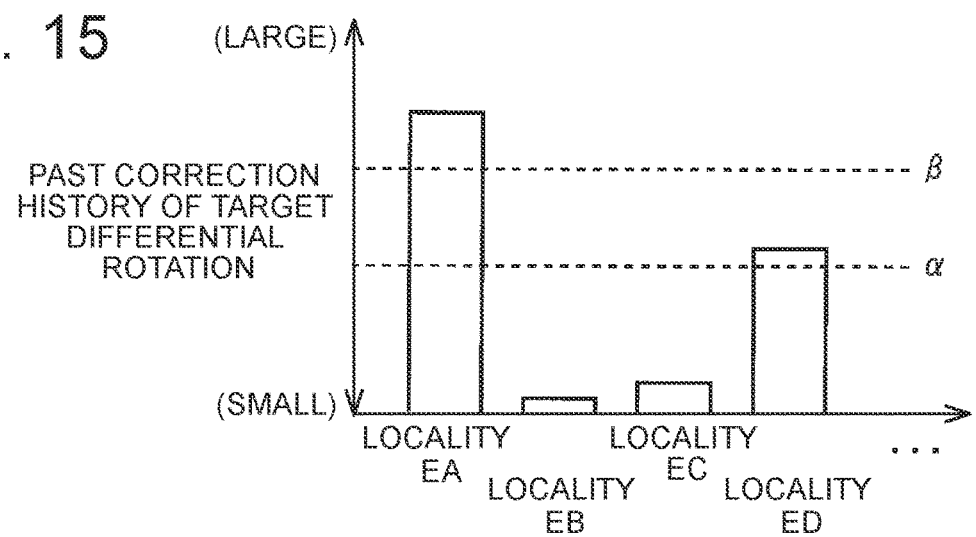
FIG. 15 is a diagram illustrating an example of past correction history by locality, used when calculating a correction coefficient Ke in accordance with past correction history by locality in step S4 in FIG. 9.

In S4 in FIG. 9, the correction coefficient Ke is calculated in accordance with past correction history by locality. That is to say, data relating to the correction coefficient Kq for a great number of vehicles 10 in which the power transmission device 16 is installed is acquired from big data or the like, and the correction coefficient Ke is calculated following the locality-based correction rules set in advance, such that the downward correction amount of the target differential rotation $\Delta N^*$ is large in localities where the downward correction amount of the target differential rotation $\Delta N^*$ obtained by the correction coefficient Kq is large, as compared to localities where the downward correction amount thereof is small FIG. 15 illustrates past correction history of each of a plurality of localities EA, EB, EC, and so forth, acquired based on the correction coefficient Kq of the great number of vehicles 10 acquired from big data or the like. The vertical axis is the average downward correction amount per vehicle 10. The downward correction amount can be found by the following Expression (6), for example, or may be the inverse of the correction coefficient Kq or the like.

$$\text{Downward correction amount} = \Delta N^* i \times (1.0 - Kq) \tag{6}$$

Figure 16:
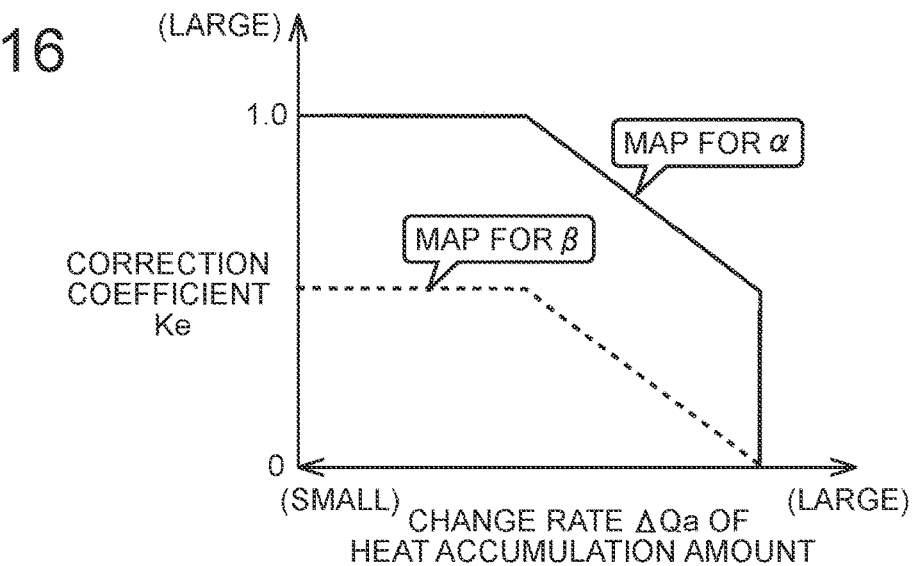
FIG. 16 is a diagram illustrating an example of a correction coefficient map used when calculating the correction coefficient Ke in accordance with past correction history by locality in step S4 in FIG. 9.

In localities where the past correction history is no smaller than a determination threshold value $\alpha$ set in advance, e.g., localities EA and ED in FIG. 15 for example, the correction coefficient Ke is calculated, and the target differential rotation $\Delta N^*$ is made smaller in accordance with the correction coefficient Ke thereof. That is to say, when the locality where the vehicle 10 executing this correction processing is traveling belongs to localities EA or ED, the target differential rotation $\Delta N^*$ is corrected in accordance with the correction coefficient Ke. In localities where the past correction history is smaller than the determination threshold value $\alpha$, Ke=1.0 is set, and correction regarding past correction history by locality is not performed. Whether correction is performed depending on the locality is equivalent to locality-based correction rules. A constant value may be set for the correction coefficient Ke, but in the first embodiment, the correction coefficient Ke is calculated in accordance with the change rate $\Delta Qa$ of the heat accumulation amount Qa, following the correction coefficient map indicated by the continuous line in FIG. 16. That is to say, there is no correction (Ke=1.0) while the change rate $\Delta Qa$ of the heat accumulation amount Qa is small, and as the change rate $\Delta Qa$ increases, the correction coefficient Ke is gradually reduced in accordance with the increase in the change rate $\Delta Qa$. Note that an arrangement may be made where a second determination threshold value $\beta$ that is a value larger than the determination threshold value $\alpha$ is set, and in a locality where the past correction history is no smaller than the second determination threshold value $\beta$, such as locality EA in FIG. 15 for example, the correction coefficient Ke is calculated using a correction coefficient map where the correction coefficient Ke is small even when the change rate $\Delta Qa$ of the heat accumulation amount Qa is small, and as the change rate $\Delta Qa$ increases, the correction coefficient Ke is gradually reduced even further in accordance with the increase in the change rate $\Delta Qa$, as indicated by the dashed line in FIG. 16.

Figure 17:
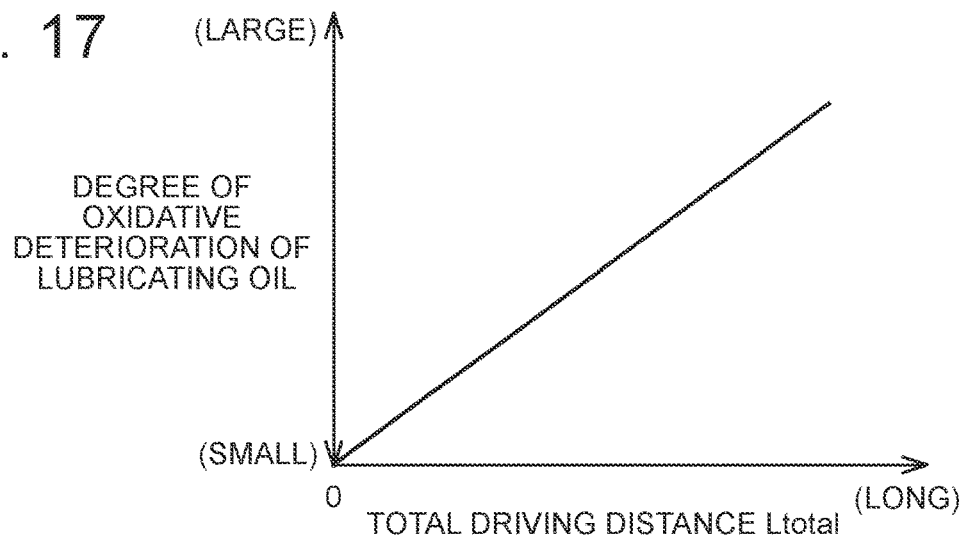
FIG. 17 is a diagram illustrating an example of a map for finding a degree of oxidative deterioration in accordance with total driving distance, when calculating a correction coefficient Ko in accordance with the degree of oxidative deterioration of lubricating oil in step S5 in FIG. 9.
Figure 18:
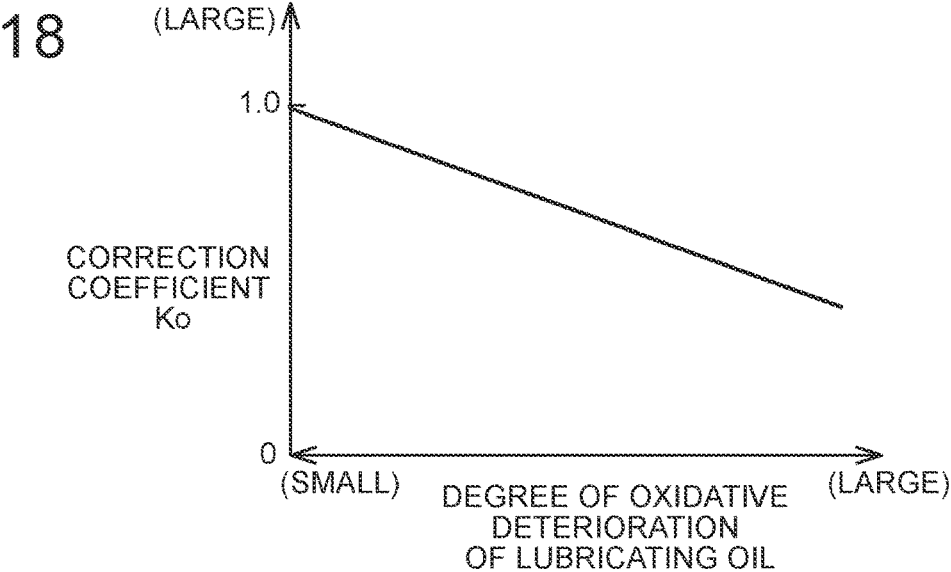
FIG. 18 is a diagram illustrating an example of a correction coefficient map used when calculating the correction coefficient Ko in accordance with the degree of oxidative deterioration of lubricating oil in step S5 in FIG. 9.

In S5 in FIG. 9, the correction coefficient Ko is calculated in accordance with the degree of oxidative deterioration of the hydraulic operating fluid in the hydraulic fluid pressure control circuit 54. The hydraulic operating fluid also functions as lubricating oil for lubricating and cooling the lockup clutch 32. That is to say, when the degree of oxidative deterioration of the hydraulic operating fluid is large, there is a possibility that the durability performance of the friction plates 38 and 44 may deteriorate, and accordingly, the target differential rotation $\Delta N^*$ is corrected in accordance with the degree of oxidative deterioration, following lubricating oil deterioration correction rules set in advance, so that the target differential rotation $\Delta N^*$ is smaller in comparison with a case where the degree of oxidative deterioration is small. The degree of oxidative deterioration of hydraulic operating fluid progresses in accordance with the total driving distance Ltotal of the vehicle 10 for example, and accordingly the degree of oxidative deterioration is found in accordance with the total driving distance Ltotal, following a map set in advance so that the longer the total driving distance Ltotal is, the larger the degree of oxidative deterioration becomes, as illustrated in FIG. 17. For the map, a map set in advance by experimentation or the like may be used without change, or may be updated as appropriate using big data. The correction coefficient Ko is then calculated in accordance with the degree of oxidative deterioration, following a correction coefficient map set in advance such that the correction coefficient Ko continuously becomes smaller as the degree of oxidative deterioration becomes larger, i.e., so that the downward correction amount of the target differential rotation $\Delta N^*$ becomes larger, as illustrated in FIG. 18 for example. The correction coefficient map is equivalent to the lubricating oil deterioration correction rules. Note that the degree of oxidative deterioration of hydraulic operating fluid is also affected by the hydraulic operating fluid temperatures T1oil and T2oil, usage time (driving time and so forth), rotations of parts such as the turbine rotations Nt and so forth, besides the total driving distance Ltotal of the vehicle 10. Accordingly, the degree of oxidative deterioration can also be estimated using integration values or cumulative values or the like thereof.

Figure 19:
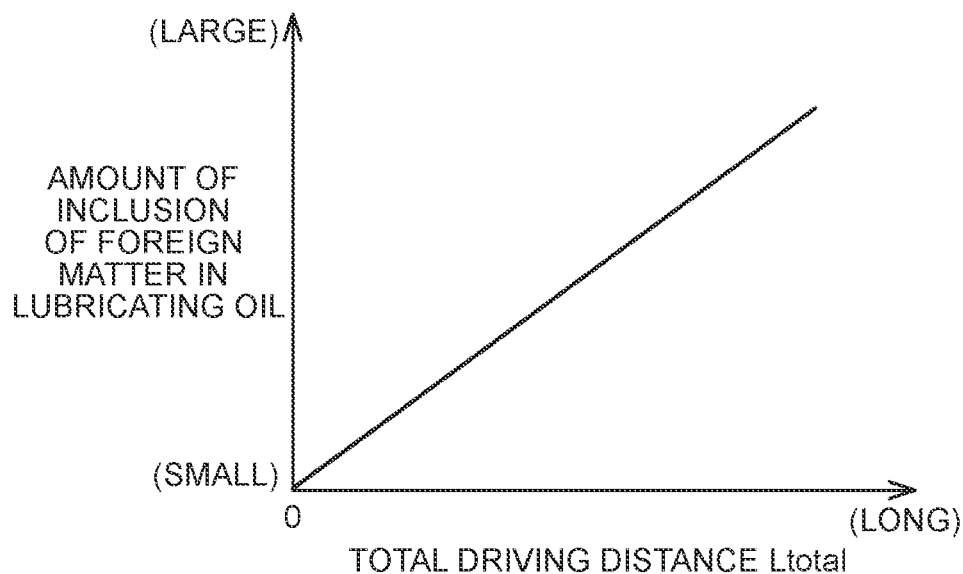
FIG. 19 is a diagram illustrating an example of a map for finding an amount of inclusion of foreign matter in accordance with total driving distance, when calculating a correction coefficient Kf in accordance with the amount of inclusion of foreign matter in lubricating oil in step S6 in FIG. 9.
Figure 20:
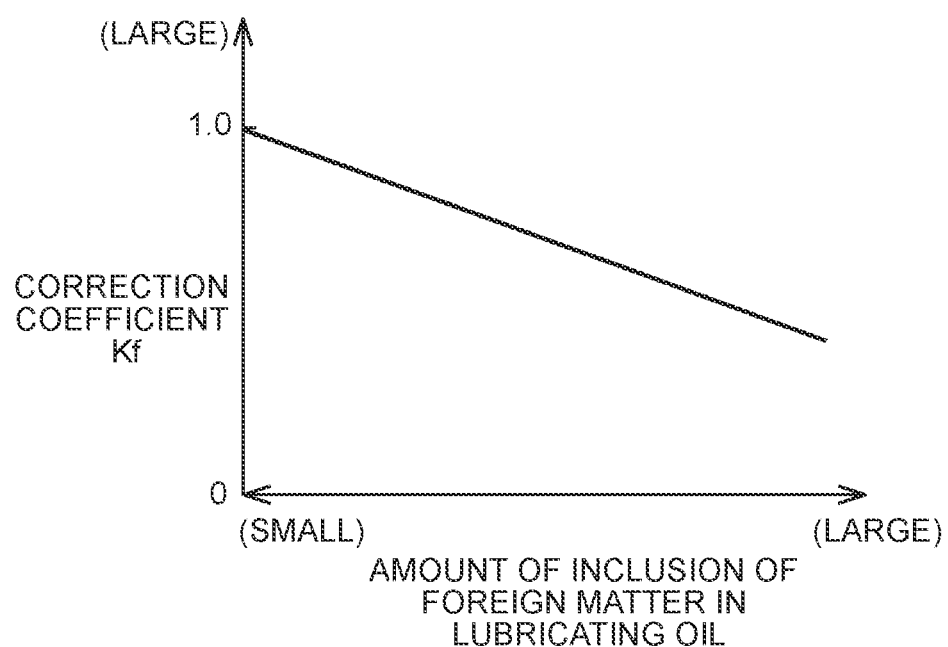
FIG. 20 is a diagram illustrating an example of a correction coefficient map used when calculating the correction coefficient Kf in accordance with the amount of inclusion of foreign matter in lubricating oil in step S6 in FIG. 9.

In S6 in FIG. 9, the correction coefficient Kf is calculated in accordance with the amount of inclusion of foreign matter in the hydraulic operating fluid of the hydraulic fluid pressure control circuit 54. The hydraulic operating fluid also functions as lubricating oil for lubricating and cooling the lockup clutch 32. That is to say, when the amount of inclusion of foreign matter in the hydraulic operating fluid is large, there is a possibility that the durability performance of the friction plates 38 and 44 may deteriorate, and accordingly, the target differential rotation $\Delta N^*$ is corrected in accordance with the amount of inclusion of foreign matter, following foreign matter inclusion correction rules set in advance, so that the target differential rotation $\Delta N^*$ is smaller in comparison with a case where the amount of inclusion of foreign matter is small. The amount of inclusion of foreign matter in hydraulic operating fluid increases in accordance with the total driving distance Ltotal of the vehicle 10 for example, and accordingly the amount of inclusion of foreign matter is found in accordance with the total driving distance Ltotal, following a map set in advance such that the longer the total driving distance Ltotal is, the larger the amount of inclusion of foreign matter becomes, as illustrated in FIG. 19. For the map, a map set in advance by experimentation or the like may be used without change, or may be updated as appropriate using big data. The correction coefficient Kf is then calculated in accordance with the amount of inclusion of foreign matter, following a correction coefficient map set in advance such that the correction coefficient Kf continuously becomes smaller as the amount of inclusion of foreign matter becomes larger, i.e., so that the downward correction amount of the target differential rotation $\Delta N^*$ becomes larger, as illustrated in FIG. 20, for example. The correction coefficient map is equivalent to the foreign matter inclusion correction rules. Note that the amount of inclusion of foreign matter is also affected by the transmission torque, usage time (driving time and so forth), rotations of parts such as gears and so forth, besides the total driving distance Ltotal of the vehicle 10. Accordingly, the amount of inclusion of foreign matter can also be estimated using integration values or cumulative values or the like thereof.

Then, in S7, the correction coefficient Kq found in accordance with transition of the cumulative heat accumulation amount Qac in S3, the correction coefficient Ke found in accordance with the past correction history by locality in S4, the correction coefficient Ko found in accordance with the degree of oxidative deterioration of the hydraulic operating fluid in S5, and the correction coefficient Kf found in accordance with the amount of inclusion of foreign matter in the hydraulic operating fluid in S6, are all multiplied by the target differential rotation initial value $\Delta N^*i$, thereby calculating the target differential rotation $\Delta N^*$, as shown in the following Expression (7). Accordingly, the flex lockup control unit 114 executes flex lockup control using the target differential rotation $\Delta N^*$.

$$\Delta N^* = \Delta N^* i \times Kq \times Ke \times Ko \times Kf \quad (7)$$

Thus, according to the lockup control device of the first embodiment, i.e., the lockup clutch control unit 110, the heat accumulation amount Qa applied to the friction plates 38 and 44 of the lockup clutch 32 when driving the vehicle 10 including during flex lockup control is calculated, and the target differential rotation $\Delta N^*$ is corrected based on transition of the heat accumulation amount Qa. Accordingly, the friction plates 38 and 44 can be appropriately protected by this correction. That is to say, the heat accumulation amount Qa is obtained by subtracting the heat dissipation amount Qr from the heat generation amount Qh, and is a parameter that reflects thermal effects on the friction plates 38 and 44 more appropriately. Accordingly, the friction plates 38 and 44 can be appropriately protected from deterioration due to heat without restricting flex lockup control beyond necessity, and durability can be improved.

Also, heat accumulation amount-based correction is performed in S3 and S7 based on the long-term change of the heat accumulation amount Qa, which is a change in the cumulative heat accumulation amount Qac obtained by cumulating the heat accumulation amount Qa, so that when the long-term change is large, the target differential rotation $\Delta N^*$ is small as compared to when the long-term change is small. That is to say, even though the effects of heat by performing flex lockup control once may be small, the friction plates 38 and 44 deteriorate due to fatigue by repeated execution of flex lockup control. However, correcting the target differential rotation $\Delta N^*$ based on the long-term change of the heat accumulation amount Qa enables deterioration of the friction plates 38 and 44 due to excessive fatigue to be suppressed, and durability to be improved.

Also, heat accumulation amount-based correction is performed in S3 and S7 so that when the cumulative heat accumulation amount Qac is large and the total driving distance Ltotal is short (i.e., when the long-term change of the heat accumulation amount Qa is large), the target differential rotation $\Delta N^*$ is small in comparison with when the cumulative heat accumulation amount Qac is small and the total driving distance Ltotal is long (i.e., when the long-term change of the heat accumulation amount Qa is small). Accordingly, deterioration of the friction plates 38 and 44 due to excessive fatigue can be appropriately suppressed, and durability can be improved.

Also, the target differential rotation ΔN* is corrected following correction rules (correction coefficient maps in FIGS. 12 through 14) set in advance for each of a plurality of regions set in advance with the total driving distance Ltotal and the cumulative heat accumulation amount Qac as parameters, in accordance with necessity levels B through D for each region, to make the target differential rotation ΔN* smaller in a region where the cumulative heat accumulation amount Qac is large and the total driving distance Ltotal is short, as compared to in a region where the cumulative heat accumulation amount Qac is small and the total driving distance Ltotal is long, as illustrated in FIG. 11. Accordingly, the target differential rotation ΔN* can be appropriately corrected in accordance with transition (magnitude of change) of different cumulative heat accumulation amounts Qac for each region, and durability of the friction plates 38 and 44 can be improved.

Also, the correction coefficient maps in FIGS. 12 through 14 are set based on the change rate ΔQa of the heat accumulation amount Qa at the current point in time, so that when the change rate ΔQa is large, the target differential rotation ΔN* is small as compared to when the change rate ΔQa is small. Accordingly, the target differential rotation ΔN* is appropriately corrected based on the change rate ΔQa of the heat accumulation amount Qa, and deterioration of the friction plates 38 and 44 due to heat can be suppressed and durability can be improved.

Also, the target differential rotation ΔN* is corrected following the correction coefficient map in FIG. 18 in accordance with the degree of oxidative deterioration of the hydraulic operating fluid of the hydraulic fluid pressure control circuit 54, used as lubricating oil, separately from the heat accumulation amount-based correction based on S3. Accordingly, increase of thermal load on the friction plates 38 and 44 from lower lubrication performance due to deterioration of hydraulic operating fluid can be suppressed, and durability can be improved.

Also, the target differential rotation ΔN* is corrected following the correction coefficient map in FIG. 20 in accordance with the amount of inclusion of foreign matter in the hydraulic operating fluid of the hydraulic fluid pressure control circuit 54, used as lubricating oil, separately from the heat accumulation amount-based correction based on S3. Accordingly, increase of thermal load on the friction plates 38 and 44 from lower lubrication performance due to inclusion of foreign matter can be suppressed, and durability can be improved.

Also, separately from the heat accumulation amount-based correction based on S3, determination is made regarding whether there is necessity of correction for each locality with different downward correction amounts of the target differential rotation ΔN* in accordance with the heat accumulation amount-based correction, and the target differential rotation ΔN* is corrected in localities EA and ED where the past correction history is large. Accordingly, the target differential rotation ΔN* is appropriately corrected in accordance with difference in the downward correction amount of the target differential rotation ΔN* due to the heat accumulation amount-based correction for each locality. That is to say, the target differential rotation ΔN* can be promptly and appropriately corrected in accordance with difference in transition of the heat accumulation amount Qa due to difference in driving conditions of the vehicle 10 and so forth for each locality, and deterioration of the friction plates 38 and 44 due to heat can be suppressed and durability can be improved.

Next, other embodiments of the disclosure will be described. Note that in the following embodiments, parts that are substantially in common with the first embodiment are denoted by the same signs, and detailed description will be omitted.

Figure 21:
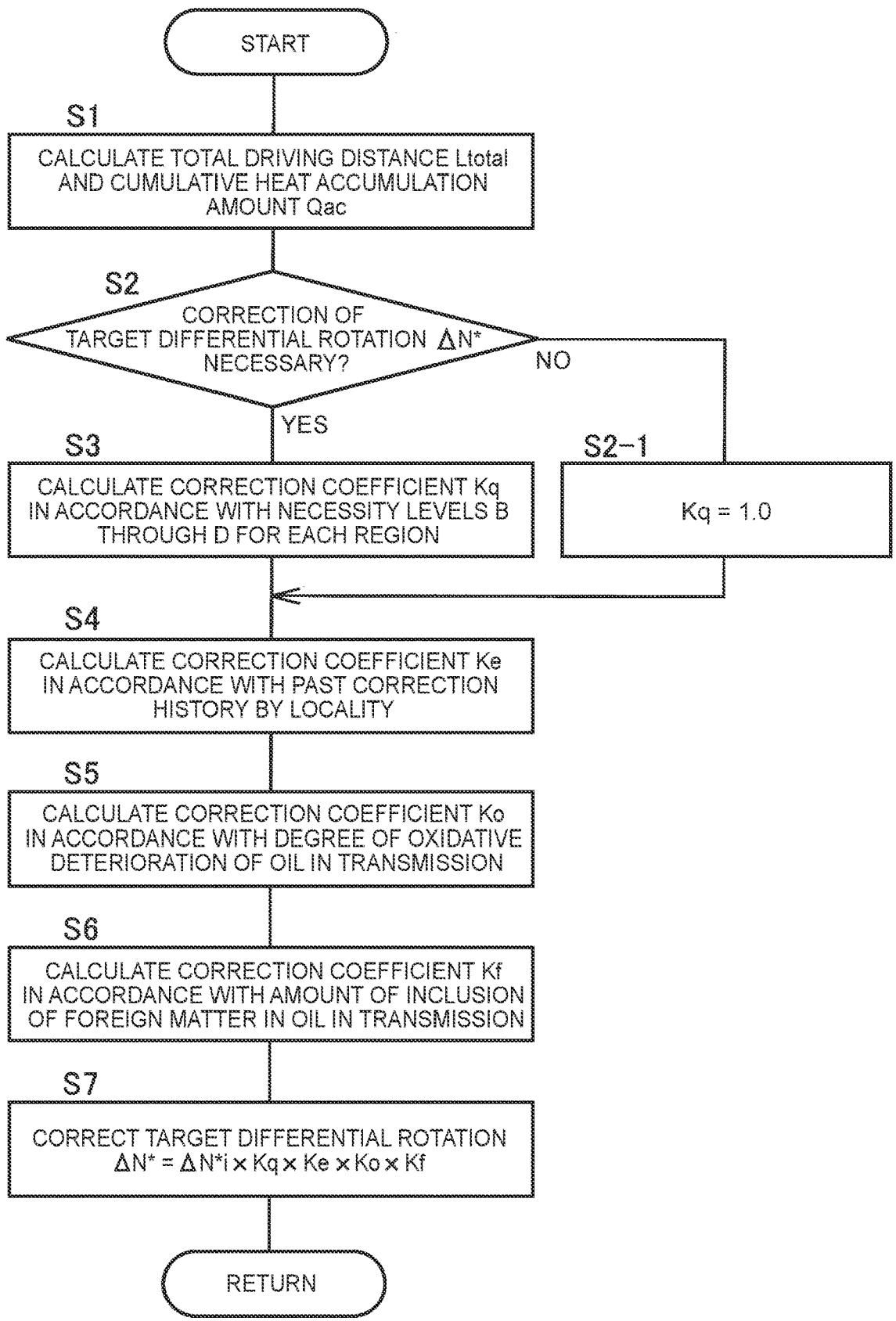
FIG. 21 is a flowchart illustrating correction processing executed by a target differential rotation correction unit of an electronic control unit in a lockup control device according to a second embodiment of the disclosure.
Figure 22:
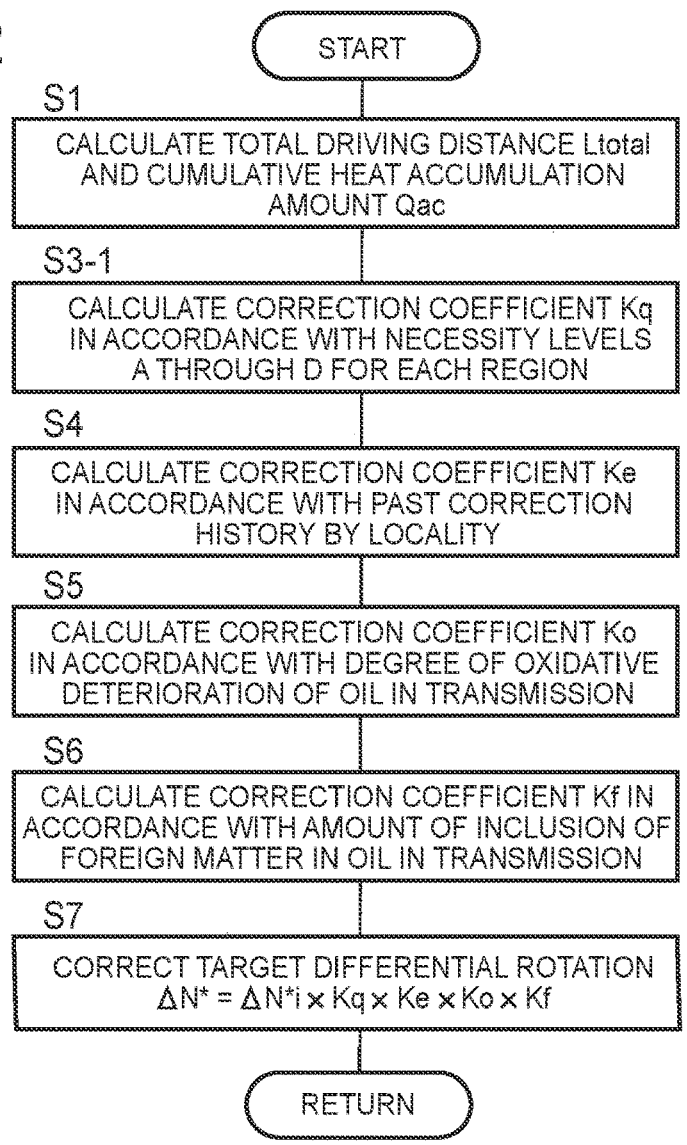
FIG. 22 is a flowchart illustrating correction processing executed by a target differential rotation correction unit of an electronic control unit in a lockup control device according to a third embodiment of the disclosure.

A second embodiment of the disclosure will be described below. In the first embodiment, when it is determined that there is no need for correction based on transition of the heat accumulation amount Qa in S2, i.e., when the transition point of the cumulative heat accumulation amount Qac as to the total driving distance Ltotal belongs to a region of necessity level A in FIG. 11, no correction is performed at all, and in S8 the target differential rotation initial value ΔN*i is used as the target differential rotation ΔN* without change. Conversely, in the second embodiment, correction of S4 through S6 may be performed even though belonging to a region of necessity level A, as in the flowcharts in FIGS. 21 and 22. That is to say, in FIG. 21, when it is determined as NO (negative) in S2, S2-1 is executed to set correction coefficient Kq=1.0, following which steps of S4 and thereafter are executed, and S8 is omitted.

Figure 23:
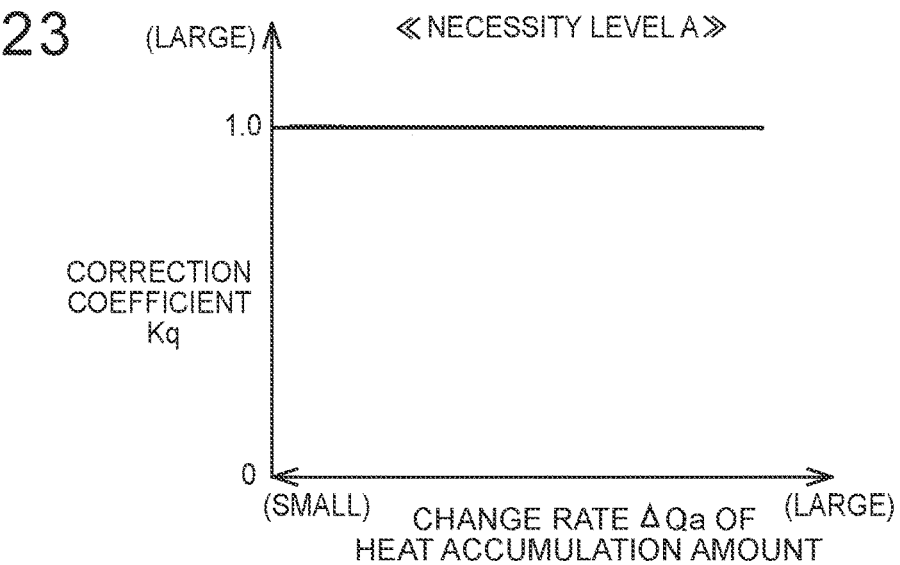
FIG. 23 is a diagram illustrating an example of a correction coefficient map used in a scenario of necessity level A, when calculating the correction coefficient Kq in accordance with necessity levels A through D for each region in step S3-1 in FIG. 22.

Next, a third embodiment of the disclosure will be described. In the third embodiment, S2 and S8 in the flowchart of FIG. 9 in the first embodiment are omitted, and S3-1 is executed following S1, as shown in the flowchart illustrated in FIG. 22. Thus, the correction coefficient Kq is calculated in accordance with necessity levels A through D in all regions, including regions of necessity level A. The correction coefficient Kq may be calculated for regions of necessity levels B through D following the correction coefficient maps in FIGS. 12 through 14 in the same way as in the first embodiment, and the correction coefficient Kq may be calculated for regions of necessity level A following the correction coefficient map illustrated in FIG. 23, for example. That is to say, substantially, correction coefficient Kq=1.0 is set in regions of necessity level A, and control that is the same as that of the flowchart illustrated in FIG. 21 in the second embodiment is performed.

Although the disclosure has been described in detail by way of the first, second, and third embodiments, with reference to the drawings, these are but embodiments, and those skilled in the art will be able to carry out the disclosure with various modifications and improvements based on their knowledge.

What is claimed is:

1. A lockup control device for a vehicle power transmission device, the vehicle power transmission device including a fluid transmission device including a lockup clutch, the lockup control device comprising:
   a processor programmed to:
      execute flex lockup control to cause slip-engagement of the lockup clutch such that a differential rotation between an input-side rotating member and an output-side rotating member of the fluid transmission device is a target differential rotation set in advance;
      calculate a heat accumulation amount applied to friction members of the lockup clutch;
      calculate a long-term change that is a change in a cumulative heat accumulation amount obtained by cumulating the heat accumulation amount, as a transition of the heat accumulation amount; and correct the target differential rotation to make the target differential rotation smaller when the long-term change is large, as compared to when the long-term change is small.

2. The lockup control device for the vehicle power transmission device according to claim 1, wherein:
the long-term change is the change in the cumulative heat accumulation amount with respect to a driving distance of a vehicle; and
the processor is programmed to correct the target differential rotation to make the target differential rotation smaller when the cumulative heat accumulation amount is large and the driving distance is short, as compared to when the cumulative heat accumulation amount is small and the driving distance is long.

3. The lockup control device for the vehicle power transmission device according to claim 2, wherein the processor is programmed to:
correct the target differential rotation following a correction rule set in advance for each of a plurality of regions set in advance with the driving distance and the cumulative heat accumulation amount as parameters, to make the target differential rotation smaller in a region where the cumulative heat accumulation amount is large and the driving distance is short, as compared to a region where the cumulative heat accumulation amount is small and the driving distance is long.

4. The lockup control device for the vehicle power transmission device according to claim 1, wherein the processor is programmed to:
calculate a change rate of the heat accumulation amount per unit time at a current point in time, in addition to the long-term change; and
correct the target differential rotation to make the target differential rotation smaller when the change rate is large, as compared to when the change rate is small.

5. The lockup control device for the vehicle power transmission device according to claim 1, wherein, in addition to correcting the target differential rotation based on the long-term change, the processor is programmed to:
correct the target differential rotation in accordance with a degree of oxidative deterioration of lubricating oil that lubricates the friction members following a lubricating oil deterioration correction rule set in advance, to make the target differential rotation smaller when the degree of oxidative deterioration is large, as compared to when the degree of oxidative deterioration is small.

6. The lockup control device for the vehicle power transmission device according to claim 1, wherein, in addition to correcting the target differential rotation based on the long-term change, the processor is programmed to:
correct the target differential rotation in accordance with an amount of inclusion of foreign matter in lubricating oil that lubricates the friction members following a foreign matter inclusion correction rule set in advance, to make the target differential rotation smaller when the amount of inclusion of foreign matter is large, as compared to when the amount of inclusion of foreign matter is small.

7. The lockup control device for the vehicle power transmission device according to claim 1, wherein, in addition to correcting the target differential rotation based on the long-term change, the processor is programmed to:
correct the target differential rotation for each of a plurality of localities where a vehicle in which the vehicle power transmission device is installed is used, following a locality-based correction rule set in advance, to make a correction amount of the target differential rotation larger in a locality where the correction amount of the target differential rotation due to correction of the heat accumulation amount is large as compared to a locality where the correction amount due to correction of the heat accumulation amount is small.

8. A lockup control method for a vehicle power transmission device, the vehicle power transmission device provided with a fluid transmission device including a lockup clutch, the lockup control method comprising:
controlling the lockup clutch to perform slip-engagement such that a differential rotation between an input-side rotating member and an output-side rotating member of the fluid transmission device is a target differential rotation set in advance;
calculating a heat accumulation amount applied to friction members of the lockup clutch;
calculating a long-term change that is a change in a cumulative heat accumulation amount obtained by cumulating the heat accumulation amount, as a transition of the heat accumulation amount; and
correcting the target differential rotation to make the target differential rotation smaller when the long-term change is large, as compared to when the long-term change is small.

* * * * *